(12) United States Patent
Abe et al.

(10) Patent No.: US 8,353,532 B2
(45) Date of Patent: Jan. 15, 2013

(54) AIRBAG AND AIRBAG APPARATUS

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 497 days.

(21) Appl. No.: 12/450,888

(22) PCT Filed: Apr. 24, 2008

(86) PCT No.: PCT/JP2008/057891
§ 371 (c)(1),
(2), (4) Date: Oct. 16, 2009

(87) PCT Pub. No.: WO2008/136336
PCT Pub. Date: Nov. 13, 2008

(65) Prior Publication Data
US 2010/0109303 A1    May 6, 2010

Related U.S. Application Data

(63) Continuation-in-part of application No. 11/507,569, filed on Aug. 22, 2006, now Pat. No. 7,607,690.

(30) Foreign Application Priority Data

May 1, 2007   (JP) .................................. 2007-120654

(51) Int. Cl.
*B60R 21/239* (2006.01)
(52) U.S. Cl. ..................................... 280/739; 280/743.2
(58) Field of Classification Search .................. 280/739, 280/743.2, 731; *B60R 21/239*
See application file for complete search history.

(56) References Cited

U.S. PATENT DOCUMENTS

| 6,832,778 | B2 * | 12/2004 | Pinsenschaum et al. ..... 280/739 |
| 2005/0248137 | A1 | 11/2005 | Delventhal et al. |
| 2006/0151979 | A1 | 7/2006 | DePottey et al. |
| 2007/0045997 | A1 * | 3/2007 | Abe et al. ..................... 280/729 |

FOREIGN PATENT DOCUMENTS

| FR | 2 757 465 | 6/1998 |
| GB | 2 425 991 | 11/2006 |
| JP | 6-127330 | 5/1994 |
| JP | 7-329695 | 12/1995 |
| JP | 7-329697 | 12/1995 |
| JP | 8-1156 | 1/1996 |

(Continued)

*Primary Examiner* — Joseph Rocca
*Assistant Examiner* — Keith Frisby
(74) *Attorney, Agent, or Firm* — Foley & Lardner LLP

(57) ABSTRACT

[Subject] To provide an airbag and an airbag apparatus which are able to absorb an impact of an occupant even when a gas inflator is downsized and to fulfill demands such as downsizing, cost reduction, weight reduction, and the like of the airbag apparatus.

[Solving Means] A airbag apparatus in the present invention includes an inflator (gas generator) 1 configured to generate gas under predetermined conditions, an airbag 2 being connected to the inflator 1 and configured to be inflated and deployed, and a retainer (not shown) configured to store the airbag 2, the airbag 2 includes a vent hole 3 formed on an outer shell of the airbag 2 and opening and closing means 4 configured to open and close the vent hole 3, the opening and closing means 4 is configured to maintain the vent hole 3 in a substantially closed state until inflation and deployment of the airbag 2 are completed and bring the vent hole 3 into a fully-opened state before a flattening amount of the airbag 2 reaches a predetermined reference value.

22 Claims, 14 Drawing Sheets

FOREIGN PATENT DOCUMENTS

| | | |
|---|---|---|
| JP | 8-244555 | 9/1996 |
| JP | 9-142239 | 6/1997 |
| JP | 10-71923 | 3/1998 |
| JP | 2000-43673 | 2/2000 |
| JP | 2000142307 A * | 5/2000 |
| JP | 2004-90812 | 3/2004 |
| JP | 2005-199987 | 7/2005 |
| JP | 2005-297715 | 10/2005 |
| JP | 2006-56287 | 3/2006 |
| JP | 2007-99104 | 4/2007 |
| WO | WO 2004/009404 A2 | 1/2004 |
| WO | WO 2006/041547 A2 | 4/2006 |
| WO | WO 2006/041552 A2 | 4/2006 |

* cited by examiner

FIG. 1
(A)
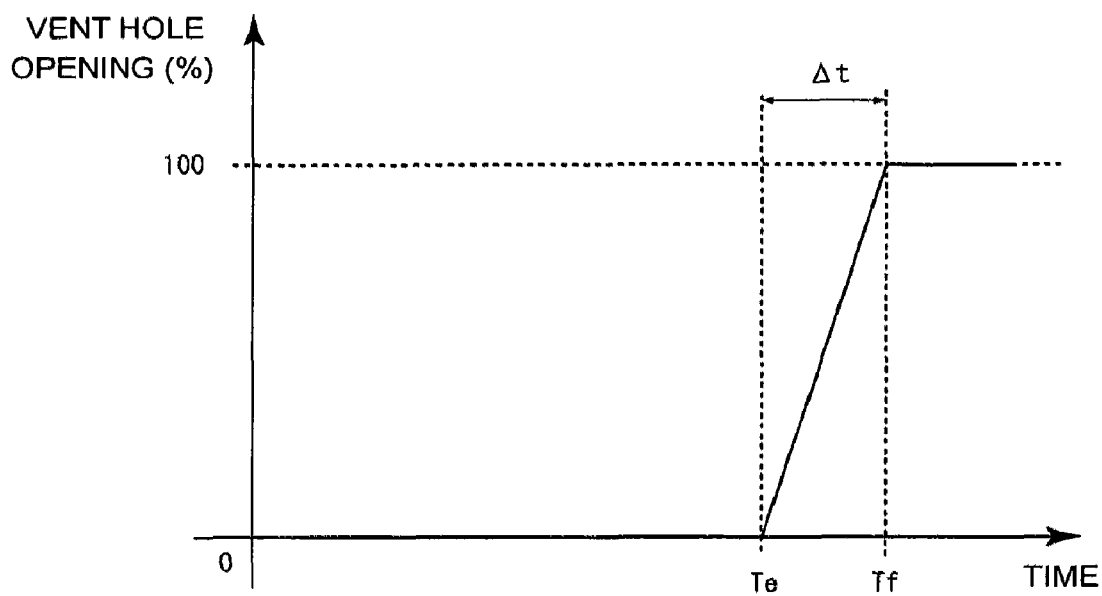
(B)
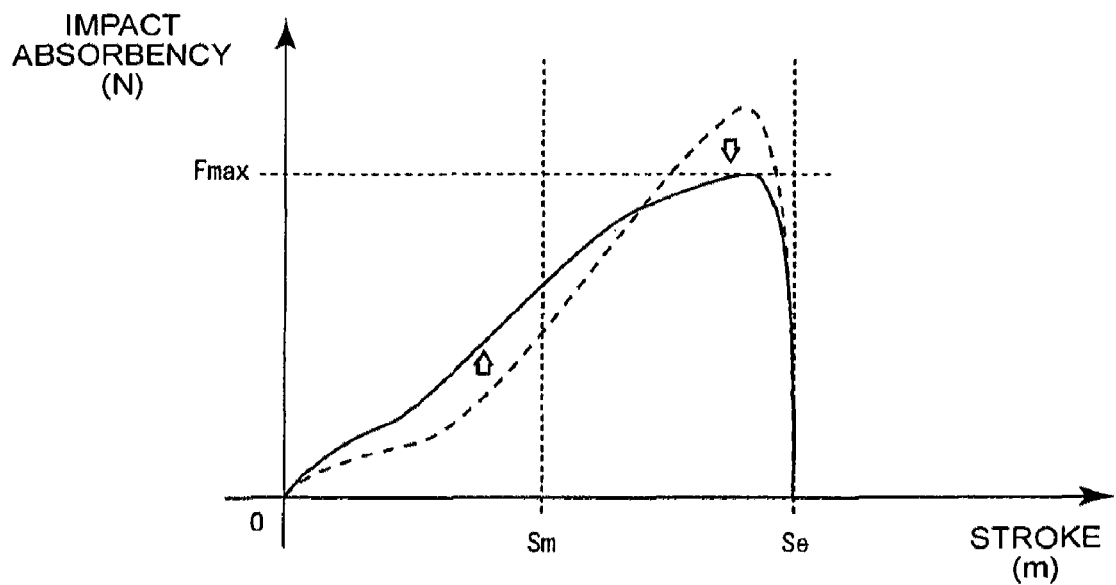

FIG. 2

(A) DRIVER AIRBAG

AIRBAG THICKNESS (mm)

| FLATTENING AMOUNT (mm) OF AIRBAG | 200 | 250 | 300 | 350 |
|---|---|---|---|---|
| 25 | 13% | 10% | 8% | 7% |
| 50 | 25% | 20% | 17% | 14% |
| 75 | 38% | 30% | 25% | 21% |
| 100 | 50% | 40% | 33% | 29% |
| 125 | 63% | 50% | 42% | 36% |
| 150 | 75% | 60% | 50% | 43% |
| 175 | 88% | 70% | 58% | 50% |

(B) PASSENGER AIRBAG

AIRBAG THICKNESS (mm)

| FLATTENING AMOUNT (mm) OF AIRBAG | 300 | 350 | 400 | 450 | 500 | 550 | 600 |
|---|---|---|---|---|---|---|---|
| 25 | 8% | 7% | 6% | 6% | 5% | 5% | 4% |
| 50 | 17% | 14% | 13% | 11% | 10% | 9% | 8% |
| 75 | 25% | 21% | 19% | 17% | 15% | 14% | 13% |
| 100 | 33% | 29% | 25% | 22% | 20% | 18% | 17% |
| 125 | 42% | 36% | 31% | 28% | 25% | 23% | 21% |
| 150 | 50% | 43% | 38% | 33% | 30% | 27% | 25% |
| 175 | 58% | 50% | 44% | 39% | 35% | 32% | 29% |
| 200 | 67% | 57% | 50% | 44% | 40% | 36% | 33% |
| 225 | 75% | 64% | 56% | 50% | 45% | 41% | 38% |
| 250 | 83% | 71% | 63% | 56% | 50% | 45% | 42% |
| 275 | 92% | 79% | 69% | 61% | 55% | 50% | 46% |
| 300 | 100% | 86% | 75% | 67% | 60% | 55% | 50% |

FIG. 3
(A)
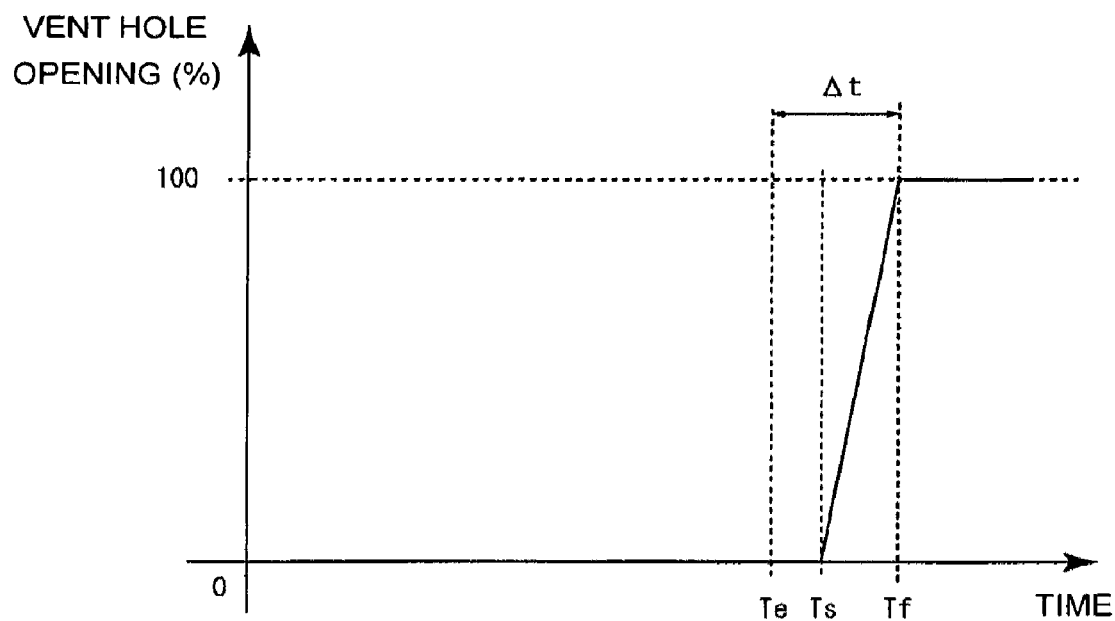
(B)
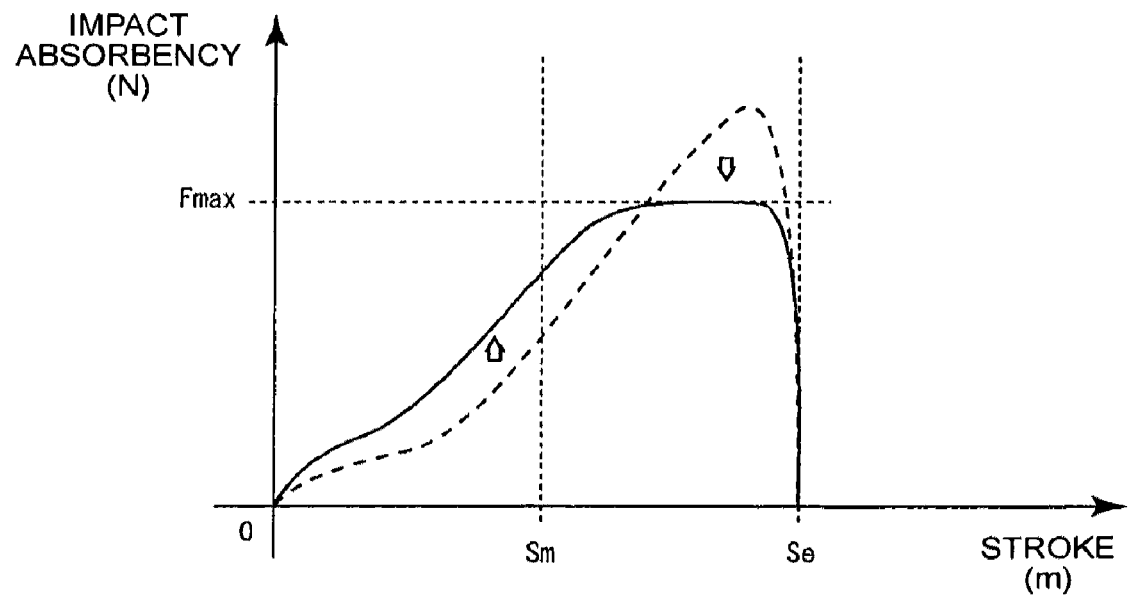

FIG. 4

(A) DRIVER AIRBAG

AIRBAG THICKNESS (mm)

| FLATTENING AMOUNT (mm) OF AIRBAG | 200 | 250 | 300 | 350 |
|---|---|---|---|---|
| 12.5 | 6% | 5% | 4% | 4% |
| 25 | 13% | 10% | 8% | 7% |
| 37.5 | 19% | 15% | 13% | 11% |
| 50 | 25% | 20% | 17% | 14% |
| 62.5 | 31% | 25% | 21% | 18% |
| 75 | 38% | 30% | 25% | 21% |
| 87.5 | 44% | 35% | 29% | 25% |

(B) PASSENGER AIRBAG

AIRBAG THICKNESS (mm)

| FLATTENING AMOUNT (mm) OF AIRBAG | 300 | 350 | 400 | 450 | 500 | 550 | 600 |
|---|---|---|---|---|---|---|---|
| 12.5 | 4% | 4% | 3% | 3% | 3% | 2% | 2% |
| 25 | 8% | 7% | 6% | 6% | 5% | 5% | 4% |
| 37.5 | 13% | 11% | 9% | 8% | 8% | 7% | 6% |
| 50 | 17% | 14% | 13% | 11% | 10% | 9% | 8% |
| 62.5 | 21% | 18% | 16% | 14% | 13% | 11% | 10% |
| 75 | 25% | 21% | 19% | 17% | 15% | 14% | 13% |
| 87.5 | 29% | 25% | 22% | 19% | 18% | 16% | 15% |
| 100 | 33% | 29% | 25% | 22% | 20% | 18% | 17% |
| 112.5 | 38% | 32% | 28% | 25% | 23% | 20% | 19% |
| 125 | 42% | 36% | 31% | 28% | 25% | 23% | 21% |
| 137.5 | 46% | 39% | 34% | 31% | 28% | 25% | 23% |
| 150 | 50% | 43% | 38% | 33% | 30% | 27% | 25% |

FIG. 5
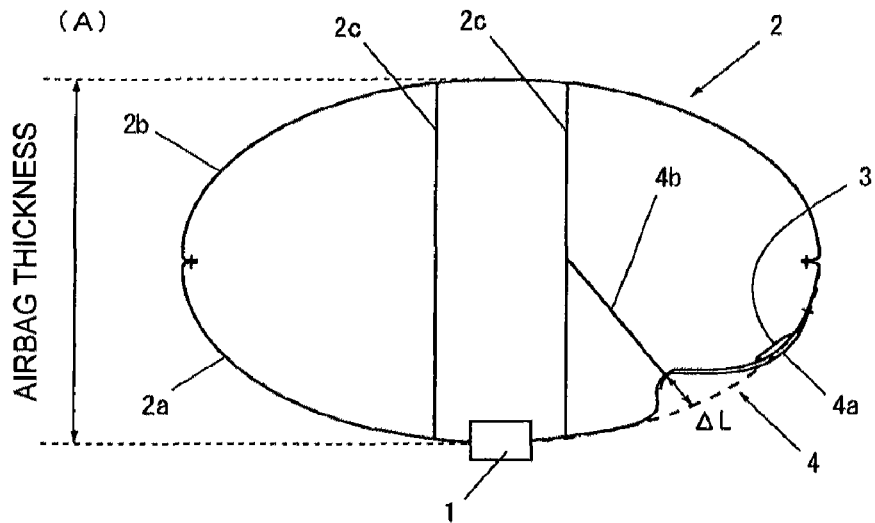
(A)
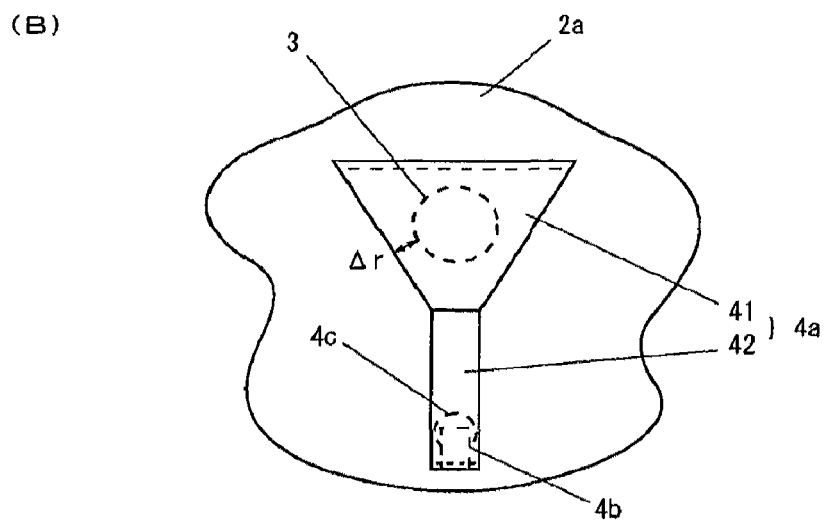
(B)
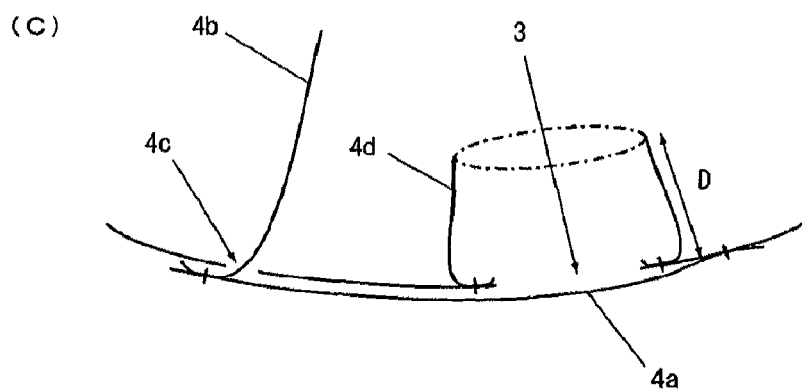
(C)

FIG. 6
(A)
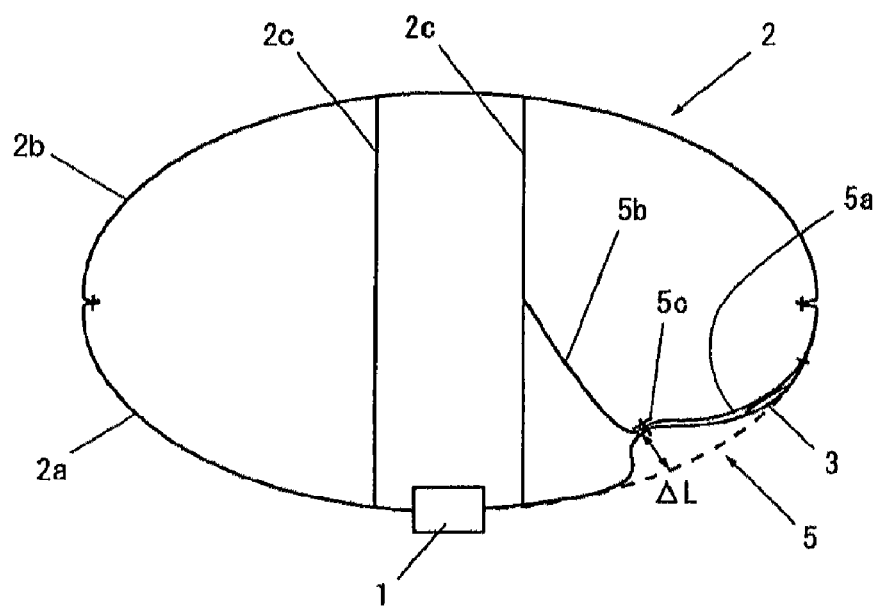
(B)
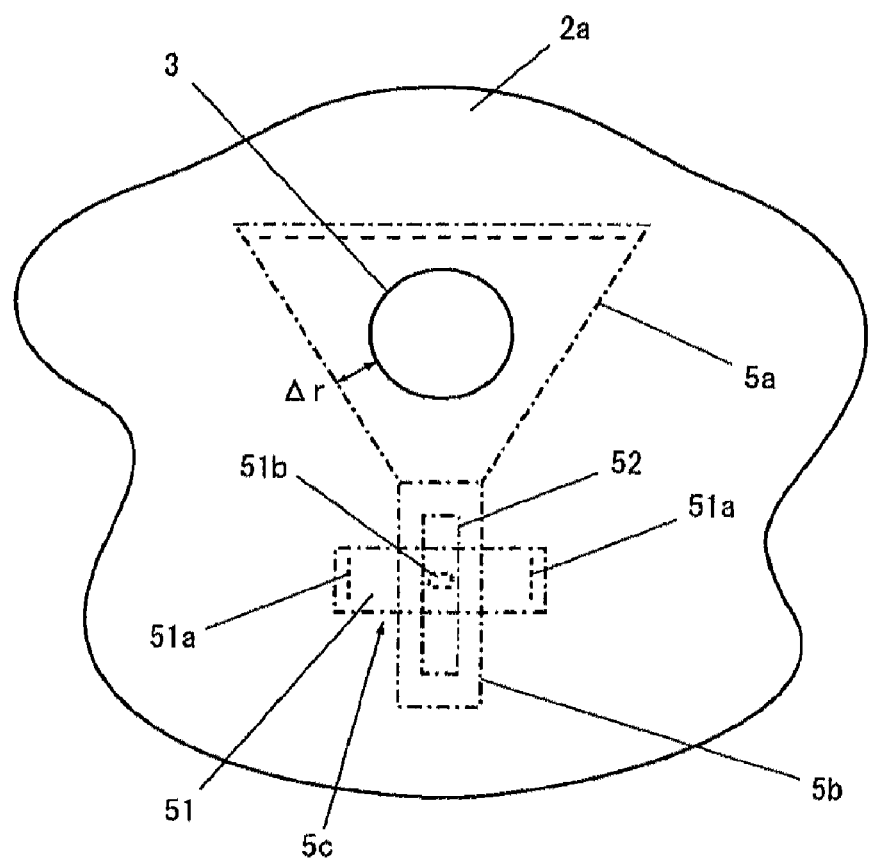

FIG. 7
(A)
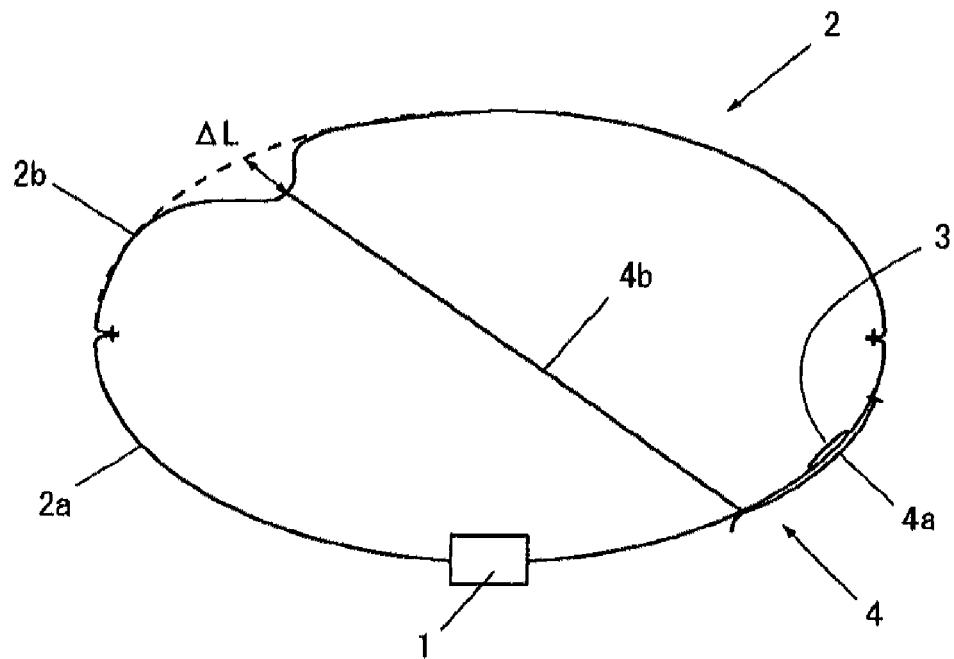
(B)
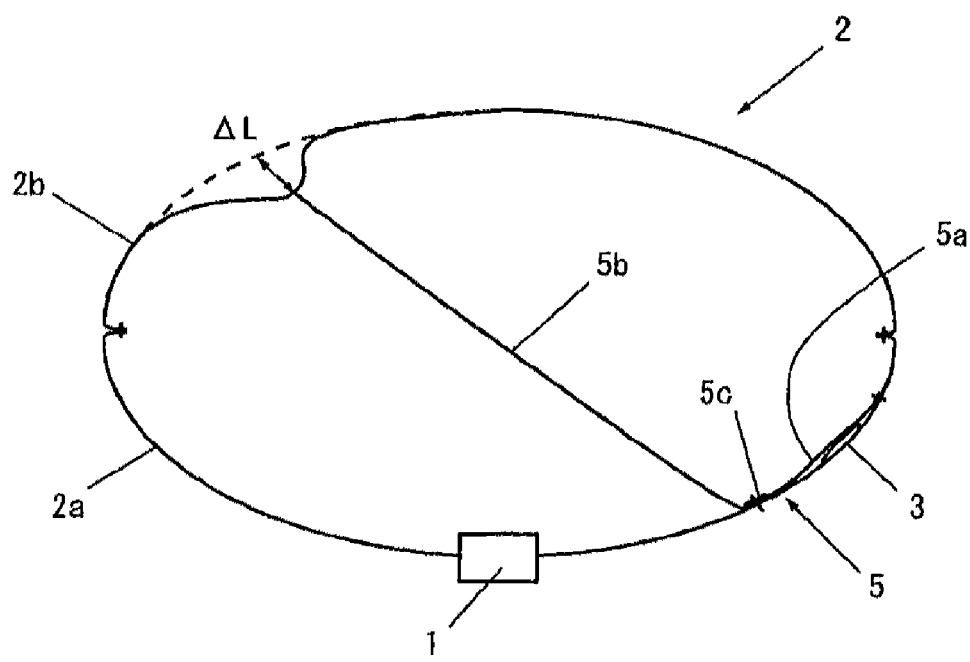

FIG. 8
(A)
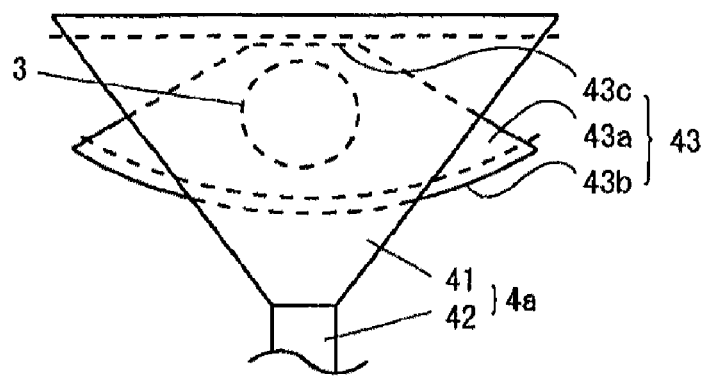
(B)
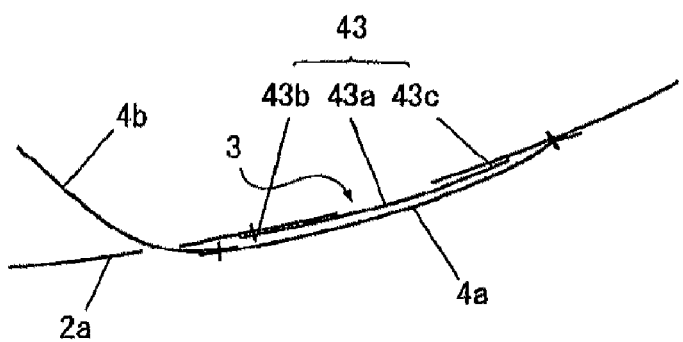
(C)
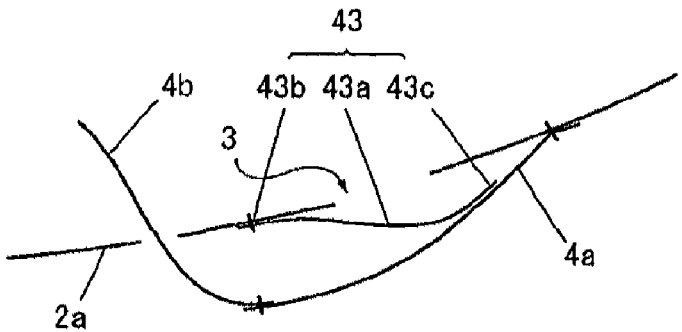
(D)
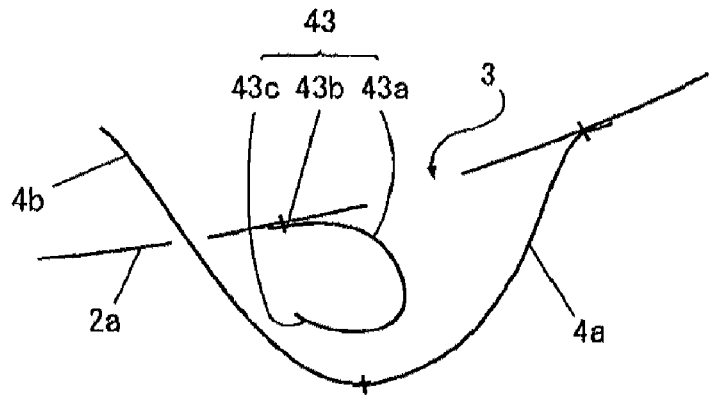

FIG. 9
(A)
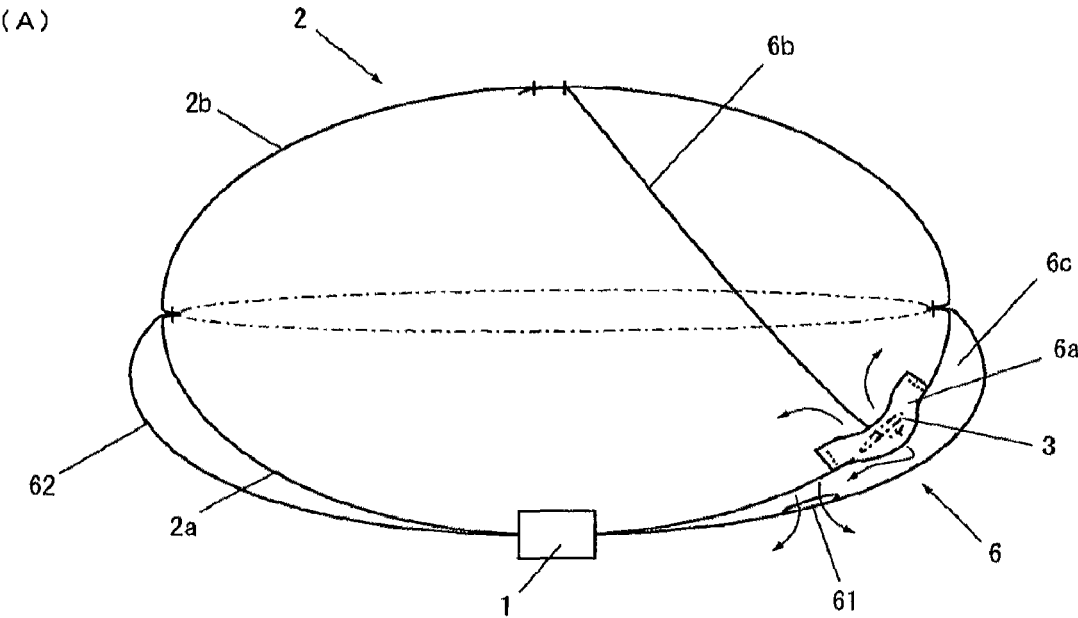
(B)
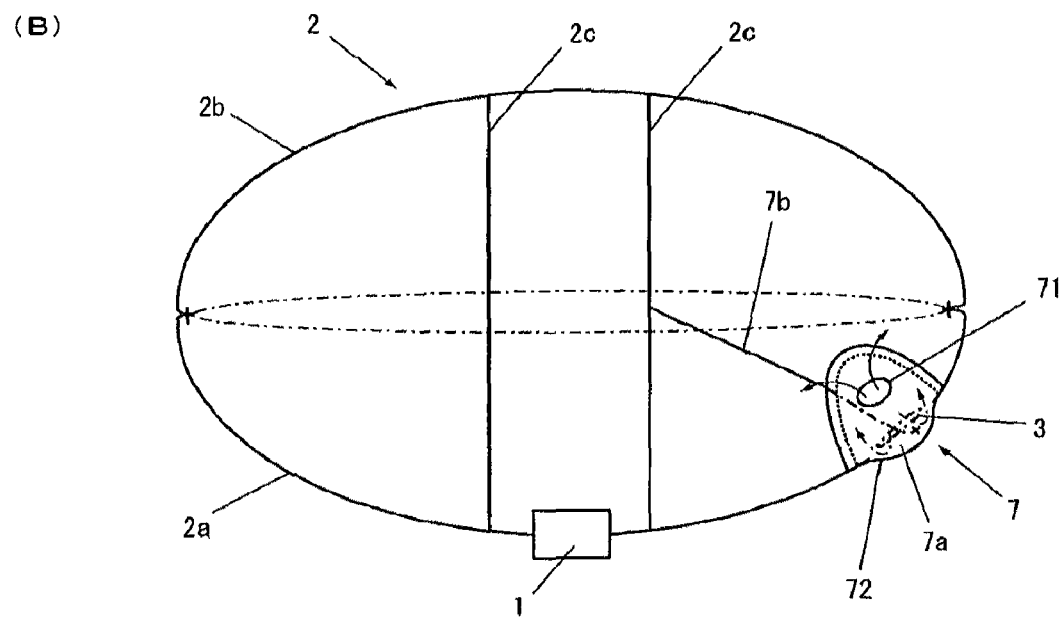

FIG. 10
(A)
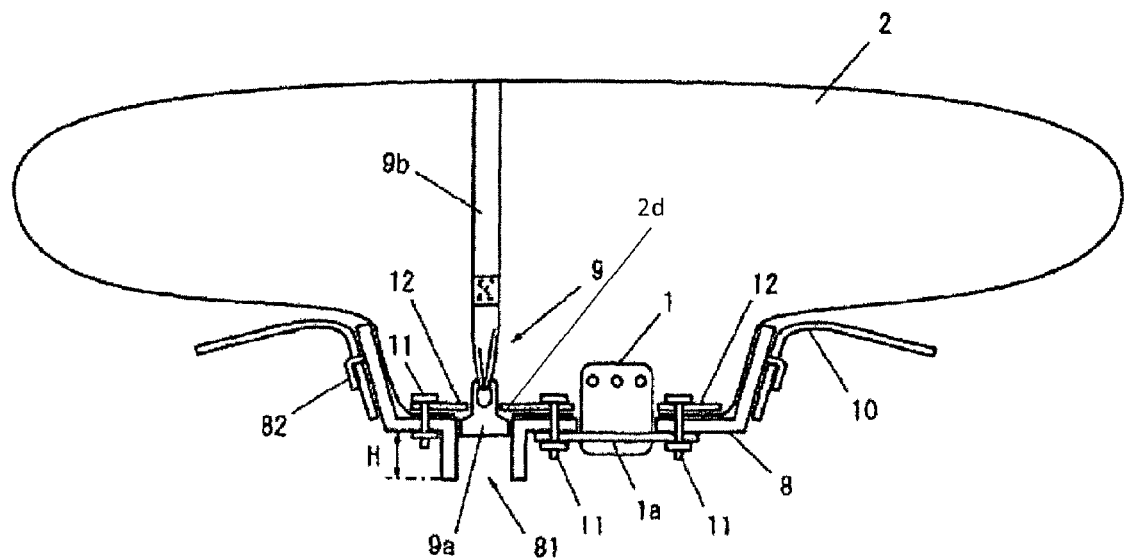
(B)
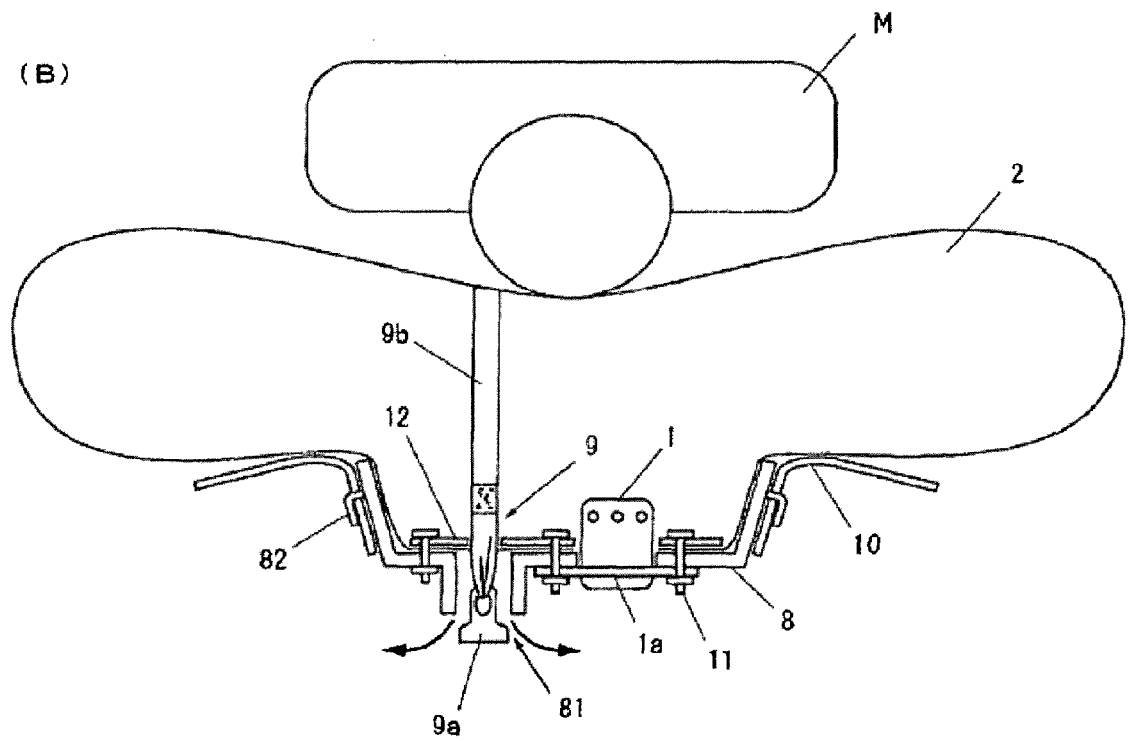

FIG. 11
(A) GAS GENERATING AMOUNT OF INFLATOR: 0.5 mol
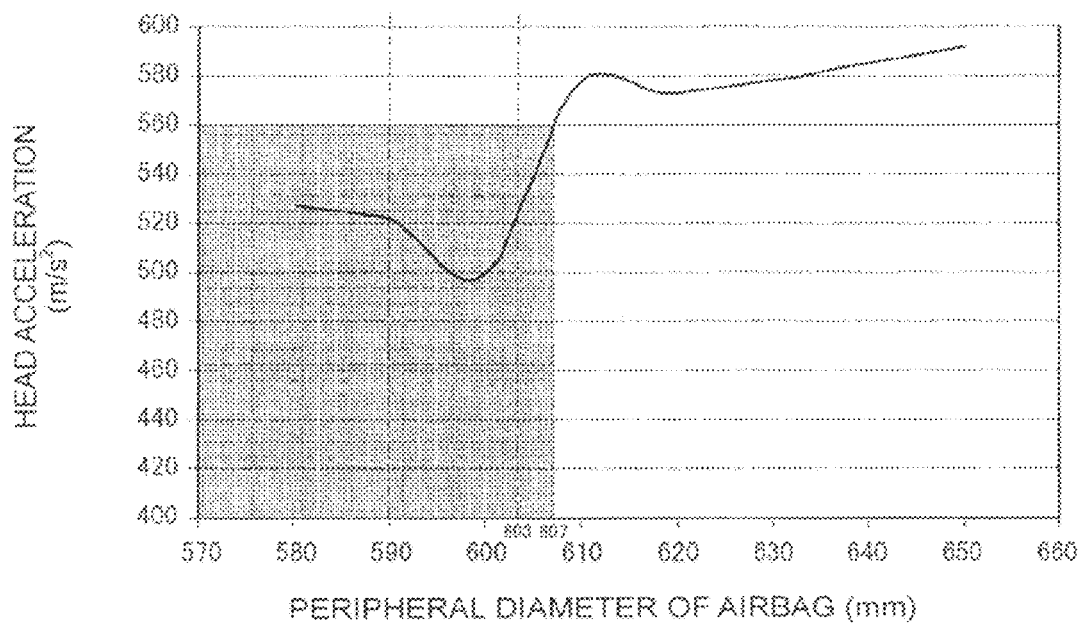
(B) GAS GENERATING AMOUNT OF INFLATOR: 0.65 mol
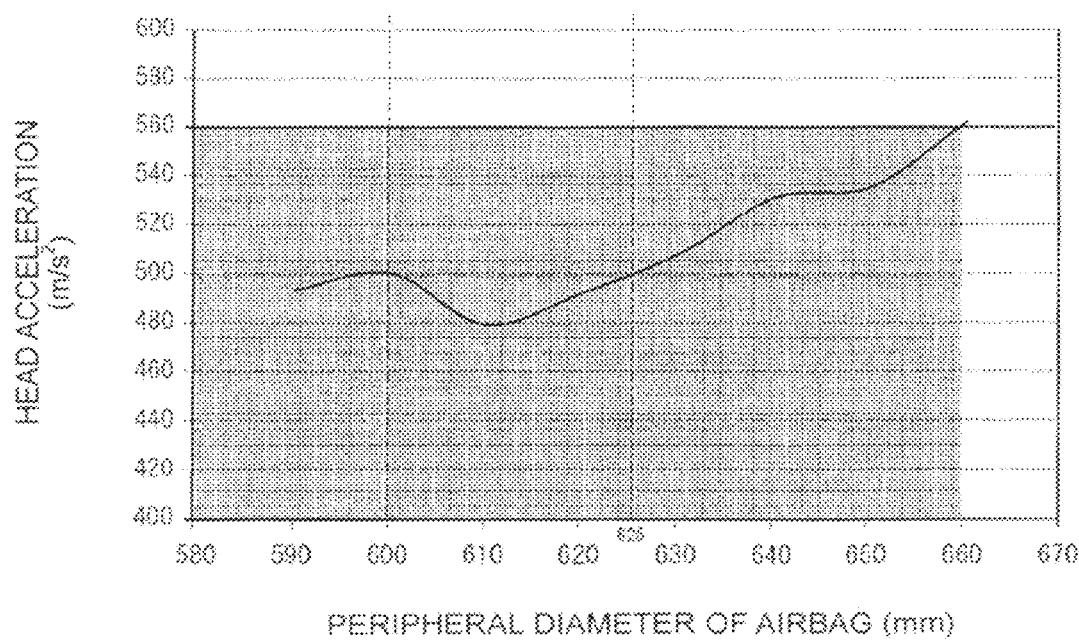

FIG. 12
(A) GAS GENERATING AMOUNT OF INFLATOR: 0.8 mol
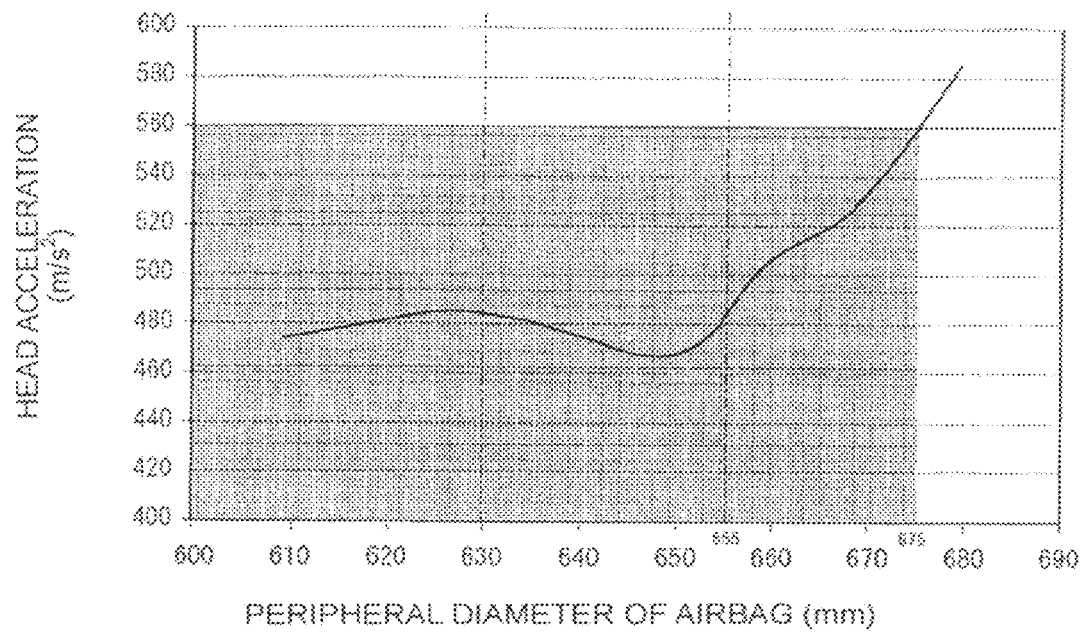
(B) GAS GENERATING AMOUNT OF INFLATOR: 0.9 mol
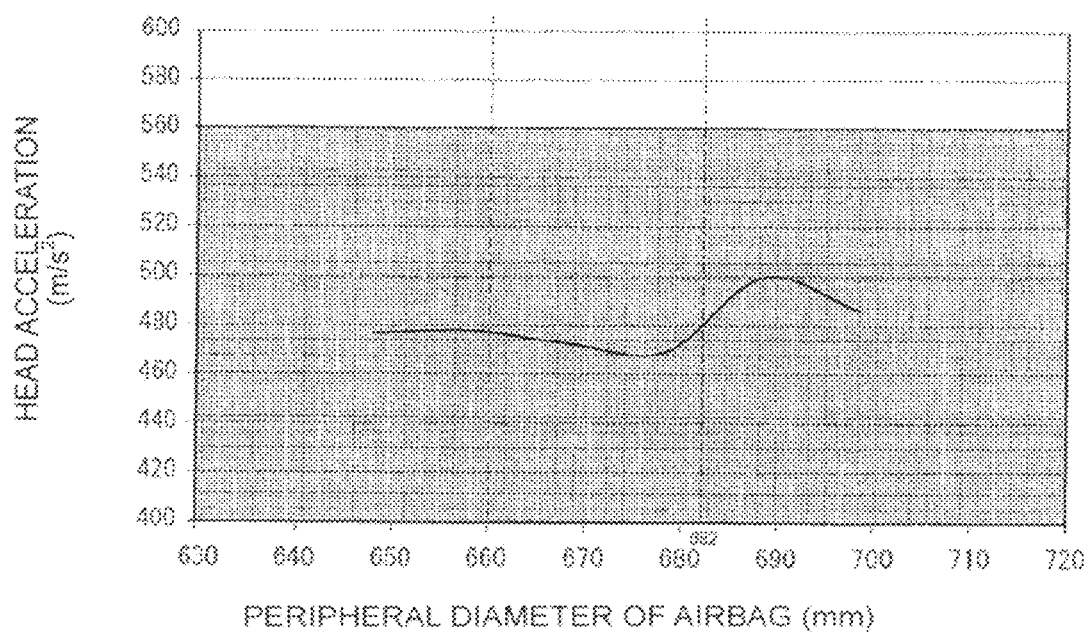

FIG. 13

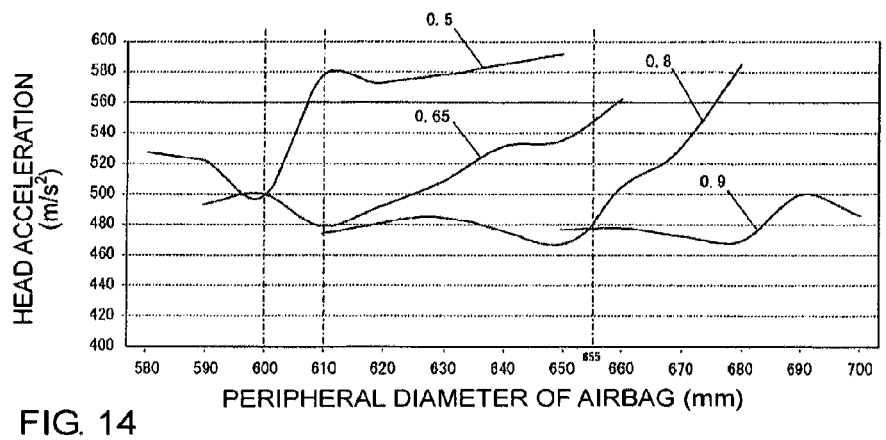

FIG. 14

(A) AIRBAG APPARATUS IN RELATED ART

| GAS GENERATING AMOUNT OF INFLATOR (mol) | 0.9 | 1 |
|---|---|---|
| PERIPHERAL DIAMETER OF AIRBAG (mm) | 590~650 | 590~710 |
| COEFFICIENT α (mol/mm) | 656~722 | 590~710 |

(B) AIRBAG APPARATUS IN PRESENT INVENTION (HEAD ACCELERATION 560 m/s² MAX.)

| GAS GENERATING AMOUNT OF INFLATOR (mol) | 0.5 | 0.65 | 0.8 | 0.9 |
|---|---|---|---|---|
| PERIPHERAL DIAMETER OF AIRBAG (mm) | 580~607 | 590~660 | 610~675 | 650~700 |
| COEFFICIENT α (mol/mm) | 1160~1214 | 908~1015 | 763~844 | 722~778 |

(C) AIRBAG APPARATUS IN PRESENT INVENTION (BEST MODE)

| GAS GENERATING AMOUNT OF INFLATOR (mol) | 0.5 | 0.65 | 0.8 | 0.9 |
|---|---|---|---|---|
| PERIPHERAL DIAMETER OF AIRBAG (mm) | 590~603 | 600~625 | 630~655 | 660~682 |
| COEFFICIENT α (mol/mm) | 1180~1206 | 923~962 | 788~819 | 733~758 |

FIG. 15
(A)
Prior Art
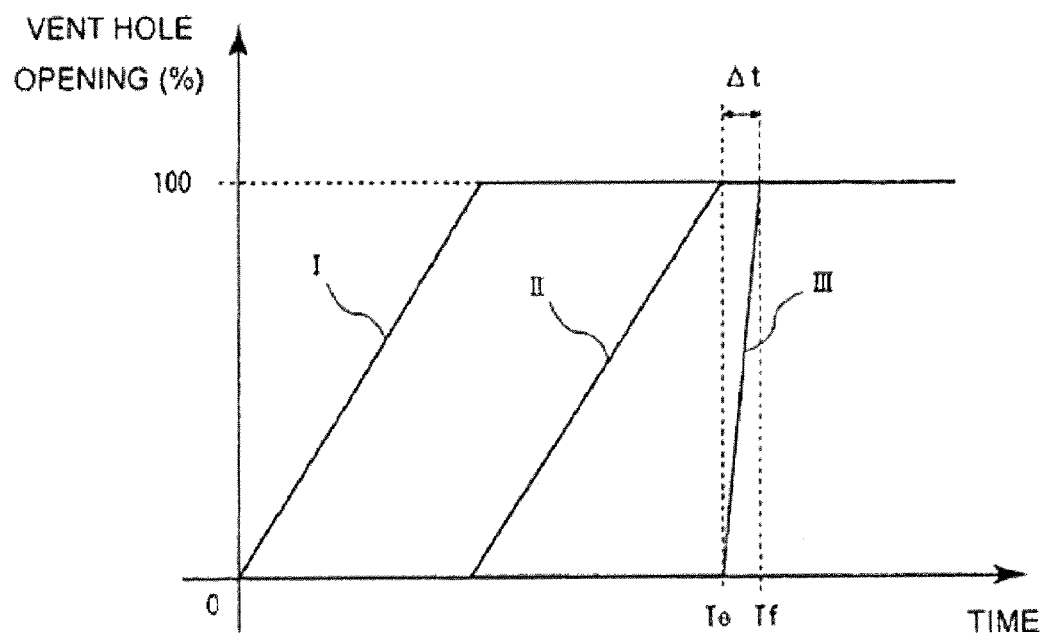
Prior Art
(B)
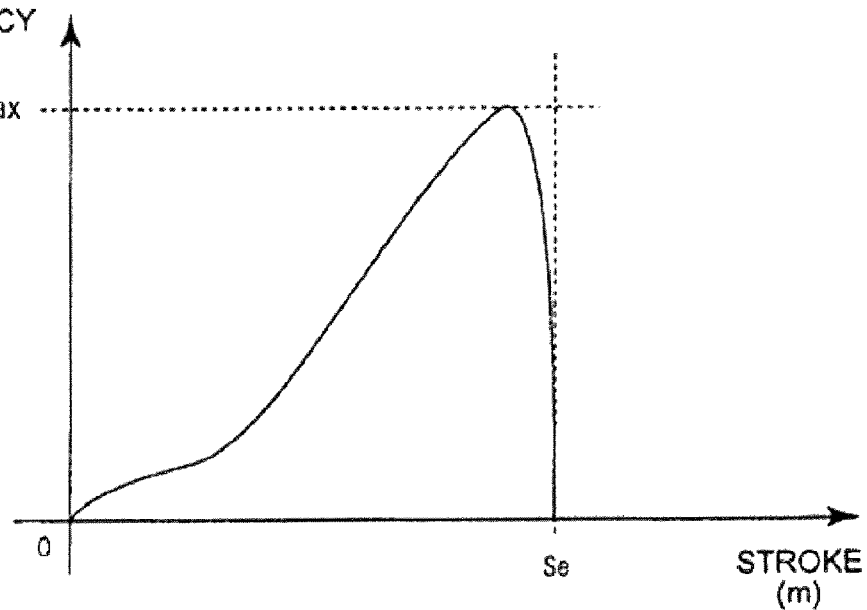

US 8,353,532 B2

AIRBAG AND AIRBAG APPARATUS

The present application is a Continuation in Part of U.S. patent application Ser. No. 11/507,569, filed Aug. 22, 2006 (now U.S. Pat. No. 7,607,690).

TECHNICAL FIELD

The present invention relates to an airbag and an airbag apparatus mounted on a vehicle such as an automotive vehicle or the like and, more specifically, to an airbag and an airbag apparatus having a characteristic in opening and closing means of a vent hole of the airbag.

BACKGROUND ART

Mounting an airbag apparatus configured to absorb an impact applied on an occupant by inflating and deploying an airbag in a cabin in case of collision or sudden deceleration on a vehicle such as an automotive vehicle or the like is becoming popular. As such an airbag apparatus, various types such as a driver airbag apparatus mounted in the interior of a steering, a passenger airbag apparatus mounted in the interior of an instrument panel, side airbag apparatuses mounted in the interiors of side surface portions of the vehicle or in the interiors of seats, curtain airbag apparatuses mounted in the interiors of upper portions of doors, knee airbag apparatuses corresponding to knees of occupants, a pedestrian airbag apparatus mounted in the interior of a portion under a hood, and so on are developed and employed. Such an airbag apparatus generally includes a gas generator configured to generate gas under predetermined conditions, an airbag configured to be inflated and deployed by being connected to the gas generator, and a retainer configured to store the airbag. Also, an outer shell which forms the airbag might be formed with an air discharge port referred to as a vent hole. The vent hole has functions to prevent an internal pressure of the airbag from becoming excessively high and to alleviate the impact by discharging gas in the airbag when the occupant comes into contact with the airbag.

Here, FIG. 15 is a drawing for explaining an operation of a vent hole of an airbag apparatus in the related art, in which (A) shows a relationship between inflation and deployment time and an opening of the vent hole of the airbag, and (B) shows a relationship between a stroke and an impact absorbency of the airbag. A lateral axis of FIG. 15(A) shows time, and reference sign Te shows inflation and deployment completion time of the airbag, and reference sign Tf shows fully-open completion time of the vent hole. A vertical axis in FIG. 15(A) shows the opening of the vent hole, and 100% shows that the vent hole is a fully-opened state. A lateral axis in FIG. 15(B) shows the stroke (length in a thickness direction) of the airbag, and reference sign Se shows an inflation-and-deployment-completed state of the airbag. A vertical axis in FIG. 15(B) shows the impact absorbency of the airbag. The impact absorbency can be reworded as a force applied to the occupant when the occupant comes into contact with the airbag.

As shown in FIG. 15(A), the airbag apparatus in the related art can be identified into three types; Type I, Type II, and Type III according to the way to be brought into the fully-opened state (opening of the vent hole; 100%). The airbag apparatus of Type I is configured in such a manner that the vent hole starts to open simultaneously with the start of inflation and deployment of the airbag, and the vent hole is brought into the fully-opened state before the inflation and deployment completion time Te of the airbag. The airbag apparatus of Type II is configured in such a manner that the vent hole starts to open after some time from the start of inflation and deployment of the airbag, and the vent hole is brought into the fully-opened state at the inflation and deployment completion time Te of the airbag. The airbag apparatus of Type II is configured to solve a problem of the airbag apparatus of Type I such that a pressure loss is large since gas is discharged from the vent hole during the inflation and deployment of the airbag. The airbag apparatus of Type III is configured in such a manner that the vent hole is maintained in a substantially closed state (opening of the vent hole; about 0%) until the inflation and deployment completion time Te of the vent hole, and the vent hole is quickly brought into the fully-opened state substantially at the same time as the occupant comes into contact with the airbag. The airbag apparatus of Type III is configured to reduce the pressure loss more than the airbag apparatus of Type II. There exist the airbag apparatuses of Type III in various structures and, for example, the airbag apparatuses disclosed in Patent Document 1 to 3 are already proposed. In the airbag apparatus of Type III, it is considered to be preferable to reduce time $\Delta t$ required for bringing the vent hole into the fully-opened state as much as possible, and it is actually designed so.

FIG. 15(B) is a drawing showing a relationship between the stroke of the airbag and the impact absorbency in the airbag apparatus of Type III. As shown in FIG. 15(B), in the airbag apparatus of Type III, since the vent hole is quickly brought into the fully-opened state as soon as the occupant comes into contact with the airbag, the impact absorbency demonstrates a maximum value Fmax in the vicinity of the inflation-and-deployment-completed state Se of the airbag, and then is lowered abruptly. In other words, the impact absorbency of the airbag apparatus of Type III assumes a substantially right-angled triangle.

Patent Document 1: US2006/0151979A1
Patent Document 2: US2005/0248137A1
Patent Document 3: JP-A-6-127330

DISCLOSURE OF INVENTION

Problems to be Solved by the Invention

Incidentally, demands for downsizing, cost reduction, weight reduction, and so on of the airbag apparatus are loud and downsizing of the gas generator is inevitable in order to fulfill these demands. However, if the gas generator is downsized, its output is also lowered, so that there is a problem such that the impact of the occupant cannot be absorbed sufficiently. Also, as shown in FIG. 15(B), in the airbag apparatus in the related art, if an attempt is made to absorb the impact of the occupant efficiently also at a position where the stroke of the airbag is small, the maximum value Fmax of the impact absorbency is increased consequently, so that the downsizing of the gas generator is difficult.

The present invention is devised in view of such problems described above, it is an object of the present invention to provide an airbag and an airbag apparatus which are able to absorb an impact of an occupant even when a gas generator is downsized and to fulfill demands such as downsizing, cost reduction, weight reduction, and the like of the airbag apparatus.

Means for Solving the Problems

According to the present invention, an airbag configured to be inflated and deployed by being supplied with gas into the interior thereof including: a vent hole formed on an outer shell of the airbag; and opening and closing means configured to open and close the vent hole, in which the opening and closing means is configured to maintain the vent hole in a substantially closed state until the inflation and deployment of the airbag are completed, and bring the vent hole into a fully-opened state before a flattening amount of the airbag reaches a predetermined reference value.

The reference value may be set to a value corresponding to the flattening amount of the airbag in a thickness direction falls within a range from 10% to 50% from an inflation-and-deployment-completed state of the airbag, and within a range from 50 mm to 150 mm from the inflation-and-deployment-completed state of the airbag.

The opening and closing means may be configured in such a manner that the vent hole is maintained the substantially closed state until the flattening amount of the airbag reaches a threshold value which is smaller than the reference value. The threshold value may be set to a value corresponding to a flattening amount of the airbag in the thickness direction falls within a range from 5% to 25% from the inflation-and-deployment-completed state of the airbag, and within a range from 25 mm to 75 mm from the inflation-and-deployment-completed state of the airbag. The threshold value may be set to a value half the reference value.

The opening and closing means includes a vent cover which can cover the vent hole, a tether connected to the vent cover and the interior of the airbag, and an insertion path for the tether formed in the airbag, and the tether may be connected to a position which allows the vent hole to be brought into the fully-opened state before the flattening amount of the airbag reaches the reference value. The tether is connected to a position where the outer shell of the airbag assumes a state of being retracted inward by a predetermined length in the inflation-and-deployment-completed state of the airbag. The predetermined length is set to at least 20 mm or at least 10 mm. The opening and closing means may be configured in such a manner that the vent cover is arranged inside the vent hole and the insertion path is defined by a guide member which is stitched to the inside the airbag at both end portions thereof and a part therebetween, and the tether is inserted into the insertion path so as to avoid a stitched portion of the guide member.

The opening and closing means includes a vent cover which can cover the vent hole, a tether connected to the vent cover and the interior of the airbag, and an insertion path for the tether formed in the airbag, and the vent cover may be formed into a size which allows the vent hole to be brought into the fully-opened state before the flattening amount of the airbag reaches the reference value. Also, an auxiliary vent cover connected to the outer shell of the airbag may be provided between the vent hole and the vent cover. Also, the vent cover preferably has a shape larger than the vent hole by a predetermined width, and the predetermined width is set, for example, to at least 10 mm. The vent cover may be formed to have a surface area of at least about 2.5 times the surface area of the vent hole in the fully-opened state.

The opening and closing means includes a vent cover which can cover the vent hole from the outside, a tether connected to the vent cover and the interior of the airbag, and an insertion path for the tether formed in the airbag, a flap-shaped or a cylindrical valve stitched to an edge portion of the vent hole, and the valve may be formed to have a height which allows the vent hole to be brought into the fully-opened state before the flattening amount of the airbag reaches the reference value. The height of the valve is set, for example, to at least 20 mm.

The opening and closing means may include a vent cover which can cover the vent hole, a tether connected to the vent cover and the interior of the airbag, and a second chamber formed outside the vent hole and provided with a second vent hole. Also, an outer shell which defines the second chamber may be used as the vent cover.

According to the present invention, an airbag apparatus including a gas generator configured to generate gas under predetermined conditions; an airbag configured to be inflated and deployed by being connected to the gas generator; and a retainer configured to store the airbag, in which the airbag is the airbag described in paragraphs from 0008 to 0014. The vent hole may be formed on the retainer instead of the outer shell of the airbag.

Furthermore, the gas generator used in the airbag apparatus in the present invention is configured in such a manner that a gas generating amount of the gas generator is less than 1 mol, or an output of the gas generator is less than 200 kPa when the air bag is a driver airbag. Also, it is preferable that the gas generating amount of the gas generator is less than 3 mol, or the output of the gas generator is less than 400 kPa when the air bag is a passenger airbag.

It is possible to configure the peripheral diameter of the airbag to be 580-607 mm or 590-603 mm when the gas generating amount of the gas generator falls within a range from 0.45 to 0.55 mol, it is also possible to configure the peripheral diameter of the airbag to be 590-660 mm or 600-625 mm in a case where the gas generating amount of the gas generator is 0.6-0.7 mol, it is also possible to configure the peripheral diameter of the airbag to be 610-675 mm or 630-655 mm in a case where the gas generating amount of the gas generator is 0.75-0.85 mol, and it is also possible to configure the peripheral diameter of the airbag to be 650-700 mm or 660-682 mm when the gas generating amount of the gas generator is 0.85-0.95 mol. Furthermore, it is also possible to configure the gas generating amount of the gas generator to be 0.45-0.55 mol when the peripheral diameter of the airbag is 600 mm or lower, the gas generating amount of the gas generator to be 0.6-0.7 mol in a case where the peripheral diameter of the airbag is 600-615 mm, the gas generating amount of the gas generator to be 0.75-0.85 mol in a case where the peripheral diameter of the airbag is 615-655 mm, and the gas generating amount of the gas generator to be 0.85-0.95 mol in a case where the peripheral diameter of the airbag is 655 mm or higher. Also, it is possible to configure a coefficient $\alpha$ expressed by (peripheral diameter of the airbag)/(gas generating amount of the gas generator) to be larger than 722 and not larger than 1214, or larger than 733 and not larger than 1206.

Advantages of the Invention

The airbag and the airbag apparatus in the present invention described above is configured to absorb an impact of an occupant even when a value of a maximum value Fmax of an impact absorbency is set to a low value by preventing the impact absorbency of the airbag from lowering abruptly even when the occupant comes into contact therewith after the inflation and deployment of the airbag is completed. In other words, by such configuration that the vent hole is brought into the fully-opened state before the flattening amount of the airbag reaches a predetermined reference value, the lowering of the impact absorbency of the airbag can be restrained, so that the value of the maximum value Fmax of the impact absorbency can be set to a low value. Therefore, by employing the airbag in the present invention, the gas generator with small output can be used in the airbag apparatus, so that demands for downsizing, cost reduction, weight reduction, and so on of the airbag apparatus can be satisfied. Also, the present invention can be said to be an invention which destroys a stereotype that time Δt required for bringing the vent hole into the fully-opened state must be set to a value as small as possible and in which the time of the Δt is intentionally elongated in comparison with the airbag apparatus of Type III in the related art.

Also, by setting the reference value in the present invention so as to fall within a range from 10% to 50% or a range from 50 mm to 150 mm from the inflation-and-deployment-completed state of the airbag, the impact absorbency can be demonstrated in a portion of the airbag having a small stroke while restraining the lowering of the initial impact absorbency.

Also, by providing the threshold value which releases the substantially closed state of the vent hole, the lowering of the impact absorbency in an initial stage of contact of the occupant with the airbag can be effectively restrained. The invention having this threshold value is focused on the time Δt required for bringing the vent hole into the fully-opened state from the completion of the inflation and deployment instead of the time required for bringing the vent hole from the substantially closed state to the fully-opened state. Also, by setting the threshold value to the value half the reference value, to a range in which the flattening amount of the airbag in the thickness direction falls within a range from 5% to 25% or a range from 25 mm to 75 mm from the airbag inflation-and-deployment-completed state of the airbag, the effect of providing the threshold value can be effectively demonstrated.

Also, by connecting the tether of the opening and closing means to the position where the vent hole is brought into the fully-opened state before the flattening amount of the airbag reaches the reference value, the release of the vent hole can be delayed using a tensile force of the tether, so that the effects of the airbag in the present invention can easily be demonstrated. For example, by bringing the tether into the state in which the outer shell of the airbag is retracted inward by the predetermined length in the inflation-and-deployment-completed state of the airbag, the effects of the airbag in the present invention can easily be demonstrated. Also, by setting the predetermined length to at least 20 mm, the effects of the airbag in the present invention can effectively be demonstrated. Also, by arranging the vent cover inside the vent hole, defining the insertion path by the guide member stitched to the inside of the airbag at the both ends thereof and a substantially center portion thereof, and inserting the tether through the insertion path while avoiding the stitched portion of the substantially center portion of the guide member, the airbag which demonstrates the effects in the present invention can be provided also for the airbag of an inner-cover type having the vent cover inside the vent hole.

Also, by forming the vent cover of the opening and closing means to the size which allows the vent hole to be brought into the fully-opened state before the flattening amount of the airbag reaches the reference value, the release of the vent hole can be delayed, so that the effects of the airbag in the present invention can easily be demonstrated. For example, by forming the vent cover to the shape larger than the vent hole by the predetermined width, the effects of the airbag in the present invention can easily be demonstrated. Also, by setting the predetermined width to at least 10 mm, the effects of the airbag in the present invention can effectively be demonstrated. Also, by making the surface area of the vent cover at least about 2.5 times the surface area of the vent hole in the fully-opened state, the opening of the vent hole can be delayed, so that the effects of the airbag in the present invention can easily be demonstrated.

Also, in the case where the airbag is the airbag of an outer-cover type having the vent cover outside the vent hole, and having the valve inside the vent hole, by defining the height of the valve to bring the vent hole into the fully-opened state before the flattening amount of the airbag reaches the reference value, the time required for the valve to be discharged to the outside the vent hole can be delayed, and the release of the vent hole can be delayed, so that the effects of the airbag in the present invention can easily be demonstrated. For example, by setting the height of the valve to at least 20 mm, the effects of the airbag in the present invention can effectively be demonstrated.

Also, by forming the second chamber outside the vent hole, timing of discharging the gas from the entire airbag including the second chamber to the outside can be delayed, so that the effects of the airbag in the present invention can easily be demonstrated. In addition, by using the outer shell which defines the second chamber as the vent cover, the number of components may be reduced, and hence the weight reduction is achieved.

According to the airbag apparatus in the present invention described above, by employing the airbag in the present invention, the gas generator with small output or small gas generating amount can be used in the airbag apparatus, so that the demands for the downsizing, cost reduction, weight reduction, and so on of the airbag apparatus can be satisfied. Also, in the case of the airbag apparatus in which the vent hole and the opening and closing means are arranged on the retainer as well, the gas generator with small output or small gas generating amount can be used in the airbag apparatus, so that the demands for the downsizing, cost reduction, weight reduction, and so on of the airbag apparatus can be satisfied. In particular, in the case of the driver airbag, the gas generator having the gas generating amount less than 1 mol, or the output less than 200 kPa can be used, while in the case of the passenger airbag, the gas generator having the gas generating amount less than 3 mol or the output less than 400 kPa can be used, which is effective for the downsizing, cost reduction, weight reduction and so on of the airbag apparatus.

Also, by setting the peripheral diameter of the airbag to fall within a predetermined range with respect to the gas generating amount of the gas generator, the downsizing, cost reduction, and weight reduction of the gas generator or the airbag can effectively be achieved. Also, by selecting the gas generating amount of the gas generator so that head acceleration is lowered according to the peripheral diameter of the airbag, the downsizing, cost reduction, weight reduction of the gas generator and the airbag can effectively be achieved while improving the impact absorbency of the airbag. Furthermore, by introducing the coefficient α as an index for setting the combination of the peripheral diameter of the airbag and the gas generating amount of the gas generator and setting the coefficient α to fall within a predetermined range, the downsizing, cost reduction, weight reduction of the gas generator and the airbag can effectively be achieved.

BEST MODES FOR CARRYING OUT THE INVENTION

Referring now to FIG. 1 to FIG. 14, an embodiment of the present invention will be described. Here, FIG. 1 is a drawing for explaining an operation of a vent hole of an airbag apparatus in a first embodiment of the present invention, in which (A) shows a relationship between inflation and deployment time of the airbag and an opening of the vent hole, and (B) shows a relationship between a stroke of the airbag and an impact absorbency.

In FIG. 1(A), a lateral axis shows time, and reference sign Te shows inflation and deployment completion time of the airbag, and reference sign Tf shows hole fully-open completion time of the vent hole. Also, a vertical axis shows the opening of the vent hole, and 100% shows that the vent hole is a fully-opened state. As shown in FIG. 1(A), the airbag and the airbag apparatus of the present invention are set in such a manner that time Δt required from the inflation and deployment completion time Te of the airbag to the fully-open completion time Tf of the vent hole is longer than that in the related art. The time Δt is set in such a manner that the vent hole is brought into the fully-opened state before a flattening amount of the airbag reaches a predetermined reference value. As a structure of the airbag, which will be described later, the airbag in the present invention is an airbag which is inflated and deployed by gas being supplied into the interior thereof, including the vent hole formed on an outer shell of the airbag and opening and closing means configured to open and close the vent hole, in which the time Δt is adjusted by the opening and closing means. There is a stereotype in the airbag apparatus in the related art that the time Δt must be reduced as much as possible, while the time Δt in the present invention is intentionally set to be long.

In FIG. 1(B), a lateral axis shows a stroke (length in a thickness direction) of the airbag, reference sign Se shows an inflation-and-deployment-completed state of the airbag, and reference sign Sm shows a state of the airbag having a thickness of 50%. Also, a vertical axis shows an impact absorbency of the airbag. Here, a graph of the airbag apparatus in the present invention is shown by a solid line, and a graph of the airbag apparatus in the related art is shown by a broken line for comparison. The airbag and the airbag apparatus in the present invention are set in such a manner that the vent hole is brought into the fully-opened state before the flattening amount of the airbag reaches the predetermined reference value, and the time Δt is set to be longer than that in the related art, so that the lowering of the impact absorbency of the airbag is alleviated as shown in FIG. 1(B). Therefore, the impact absorbencies in the vicinity of the stroke Sm of the airbag having a thickness of 50% and from then onward can be improved more than in the related art. Consequently, the impact absorbency in the vicinity of the stroke Se of the airbag in the inflation-and-deployment-completed state Se can be lowered, and a maximum value Fmax can be set to a value lower than that in the related art. In other words, a pressure loss of gas supplied to the airbag can be reduced efficiently, and an output of a gas generator in the airbag apparatus can be reduced in comparison with that in the related art, so that downsizing, cost reduction, weight reduction, and so on of the airbag apparatus can be realized.

FIG. 2 is an explanatory drawing of a set range of the reference value, in which (A) shows a case of a driver airbag, and (B) shows a case of a passenger airbag. In FIGS. 2(A) and (B), the thickness (mm) of the airbag is shown in rows, and the flattening amount (mm) of the airbag is shown in columns, and the ratio (%) of the flattening amount of the airbag with respect to the thickness of the airbag is shown in cells.

Since the thickness of the driver airbag is designed to fall within a range of 200 mm to 350 mm in most cases, FIG. 2(A) shows examples of cases of 200 mm, 250 mm, 300 mm, and 350 mm. The flattening amount of the airbag is shown in intervals of 25 mm within a range from 25 mm to 175 mm. As shown in FIG. 2(A), the ratios (%) of the flattening amounts of the respective airbags are indicated within a range from 7% to 88%. Here, the airbag and the airbag apparatus in the present invention are set in such a manner that the reference value falls within a range from 10% to 50%. When the reference value is smaller than 10%, the efficiency of reduction of the pressure loss is low, and hence sufficient downsizing of the gas generator cannot be expected. However, the present invention does not exclude those having the reference values lower than 10%, and is superior in comparison with the airbag and the airbag apparatus in the related art in that not some little downsizing of the gas generator is achieved. When the reference value exceeds 50%, it is assumed that an internal pressure of the airbag is increased by an occupant coming into contact therewith, and hence a load applied to the occupant is increased, so that the effective impact absorbency cannot be achieved. However, the present invention does not exclude those having the reference values exceeding 50%, and the reference value can be set to a value higher than 50% when the impact absorbency is secured sufficiently on other conditions such as shapes or materials of the airbag, as a matter of course.

Also, the reference value can be set not only by the ratio (%) of the flattening amount of the airbag with respect to the thickness of the airbag, but also only by the flattening amount (mm) of the airbag. In this case, the reference value can be set irrespective of the size of the airbag, so that simplification of design is achieved. In this case, it is preferable to select a flattening amount (mm) common to all the airbags in a range from 200 mm to 350 mm from among the ratios (%) of the flattening amount of the airbag with respect to the thickness of the airbag described above, and it is selected within a range from 50 mm to 100 mm.

Also, since the thickness of the passenger airbag is designed to fall within a range of 300 mm to 600 mm in most cases, FIG. 2(B) shows examples of cases of 300 mm, 350 mm, 400 mm, 450 mm, 500 mm, 550 mm, and 600 mm. The flattening amount of the airbag is shown in the intervals of 25 mm within a range from 25 mm to 300 mm. As shown in FIG. 2(B), the ratios (%) of the flattening amount of the respective airbags are indicated within a range from 4% to 100%. Here, the airbag and the airbag apparatus in the present invention are set in such a manner that the reference value falls within a range from 10% to 50% in the same manner as the case of the driver airbag. When the reference value is set by the flattening amount (mm) of the airbag, it is set within a range from 75 mm to 150 mm in the same manner as the case of the driver airbag.

Subsequently, a second embodiment of the airbag and the airbag apparatus in the present invention will be described. Here, FIG. 3 is a drawing for explaining an operation of the vent hole of the airbag apparatus in the second embodiment, in which (A) shows the relationship between the inflation and deployment time of the airbag and the opening of the vent hole, and (B) shows a relationship between the stroke of the airbag and the impact absorbency.

In FIG. 3(A), a lateral axis shows time, and the reference sign Te shows the inflation and deployment completion time of the airbag, the reference sign Tf shows the fully-open completion time of the vent hole, and reference sign Ts shows opening starting time of the vent hole. Also, a vertical axis shows the opening of the vent hole, and 100% shows that the vent hole is the fully-opened state. As shown in FIG. 3(A), the airbag and the airbag apparatus in the second embodiment of the present invention are set in such a manner that the time Δt required from the inflation and deployment completion time Te of the airbag to the fully-open completion time Tf of the vent hole is longer than that in the related art and, in addition, the opening starting time Ts of the vent hole is delayed with respect to the inflation and deployment completion time Te of the airbag. In the first embodiment described above, the opening starting time Ts of the vent hole is equal to the inflation and deployment completion time Te of the airbag. However, in the second embodiment, the opening starting time Ts of the vent hole is intentionally delayed. Therefore, even though the time required from the opening starting time Ts of the vent hole to the fully-open completion time Tf of the vent hole is the same as that in the case of the opening and closing means of the vent hole in the related art, the time Δt required from the inflation and deployment completion time Te of the airbag to the fully-open completed time Tf of the vent hole can be set to be long, so that the vent hole can be set easily to be brought into the fully-opened state before the flattening amount of the airbag reaches the predetermined reference value. In other words, in the second embodiment of the present invention, since the effect of the present invention can be obtained only by delaying the activation of the opening and closing means of the vent hole in the related art, it can be applied easily to various opening and closing means. The opening and closing means in the second embodiment is configured in such a manner that the vent hole is brought into a substantially closed state until the flattening amount of the airbag reaches a threshold value which is smaller than the reference value.

In FIG. 3(B), a lateral axis shows the stroke (length in the thickness direction) of the airbag, the reference sign Se shows the inflation-and-deployment-completed state of the airbag, and the reference sign Sm shows a state of the airbag having a thickness of 50%. Also, a vertical axis shows the impact absorbency of the airbag. Here, a graph of the airbag apparatus in the second embodiment of the present invention is shown by a solid line, and a graph of the airbag apparatus in the related art is shown by a broken line for comparison. The airbag and the airbag apparatus in the second embodiment of the present invention are set in such a manner that the vent hole is brought into the fully-opened state before the flattening amount of the airbag reaches the predetermined reference value, and the time Δt is set to be longer than that in the related art, so that the lowering of the impact absorbency of the airbag is alleviated as shown in FIG. 3(B). Therefore, the impact absorbencies in the vicinity of the stroke Sm of the airbag having a thickness of 50% and from then onward can be improved more than those in the related art. Consequently, the impact absorbency in the vicinity of the stroke Se of the airbag in the inflation-and-deployment-completed state Se can be lowered, and the maximum value Fmax can be set to a value lower than that in the related art. Furthermore, in the second embodiment of the present invention, since the opening starting time Ts of the vent hole is delayed in comparison with the inflation and deployment completion time Te of the airbag, a value close to the maximum value Fmax of the impact absorbency can be maintained for a long time, and the maximum value Fmax of the impact absorbency can be set to be lower than that in the first embodiment described above. In other words, the pressure loss of gas supplied to the airbag can be reduced efficiently, and an output of the gas generator in the airbag apparatus can further be reduced, so that the downsizing, cost reduction, weight reduction, and so on of the airbag apparatus can be realized.

FIG. 4 is an explanatory drawing of a set range of the threshold value, in which (A) shows a case of the driver airbag, and (B) shows a case of the passenger airbag. In FIGS. 4(A) and (B), the thickness (mm) of the airbag is shown in rows, and the flattening amount (mm) of the airbag is shown in columns, and the ratio (%) of the flattening amount of the airbag with respect to the thickness of the airbag is shown in cells. Since the set range of the reference value is the same as the case of the first embodiment shown in FIG. 2, detailed description will be omitted here.

In FIG. 4(A), the thickness of the driver airbag is shown in the intervals of 50 mm within a range from 200 mm to 350 mm as in FIG. 2(A). In contrast, the flattening amount of the airbag is shown in intervals of 12.5 mm within a range from 12.5 mm to 87.5 mm. As shown in FIG. 4(A), the ratios (%) of the flattening amount of the respective airbags are indicated within a range from 4% to 44%. Here, the airbag and the airbag apparatus in the present invention are set in such a manner that the threshold value falls within a range from 5% to 25. When the threshold value is smaller than 5%, the time during which the value close to the maximum value Fmax of the impact absorbency can be maintained is shortened, so that the effect of the present invention is undermined in the case of the airbag apparatus in which the opening and closing means which brings the vent hole immediately into the fully-opened state as the opening and closing means of the vent hole in the related art is employed. In the case of the opening and closing means of the vent hole used in the airbag and the airbag apparatus in the first embodiment of the present invention, since the sufficient time Δt can be secured even though the threshold value is 5%, so that the threshold value can be set to a value smaller than 5% as a matter of course. When the threshold value exceeds 25%, it is assumed that the internal pressure of the airbag is increased by the occupant coming into contact therewith, and hence the load applied to the occupant is increased, so that the effective impact absorbency cannot be achieved. However, the present invention does not exclude those having the threshold values exceeding 25% and the threshold value can be set to a value higher than 25% when the impact absorbency is secured sufficiently on other conditions such as shapes or materials of the airbag, as a matter of course. The threshold value must be a value smaller than the reference value.

Also, the threshold value can be set not only by the ratio (%) of the flattening amount of the airbag with respect to the thickness of the airbag, but also only by the flattening amount (mm) of the airbag. In this case, the reference value can be set irrespective of the size of the airbag, so that simplification of design is achieved. In this case, it is preferable to select a flattening amount (mm) common to all the airbags in a range from 200 mm to 350 mm from among the ratios (%) of the flattening amount of the airbag with respect to the thickness of the airbag described above, and it is selected within a range from 25 mm to 50 mm. When setting the threshold value, it can be set arbitrarily within a range which does not exceed the reference value, and it may be set to a value half the reference value. In this case, the threshold value can be set easily by setting the reference value, so that simplification of design is achieved.

In FIG. 4(B), the thickness of the passenger airbag is shown in the intervals of 50 mm within a range from 300 mm to 600 mm as in FIG. 2(B). In contrast, the flattening amount of the airbag is shown in the intervals of 12.5 mm within a range from 12.5 mm to 150 mm. As shown in FIG. 4(B), the ratios (%) of the flattening amount of the respective airbags are indicated within a range from 2% to 50%. Here, the airbag and the airbag apparatus in the present invention are set in such a manner that the threshold value falls within a range from 5% to 25% in the same manner as the case of the driver airbag. When the threshold value is set by the flattening amount (mm) of the airbag, it is set within a range from 37.5 mm to 75 mm in the same manner as the case of the driver airbag. The threshold value may be set to the value half the reference value.

Subsequently, the structures of the airbag and the airbag apparatus in the present invention will be described. Here, FIG. 5 is a drawing showing the structures of the airbag and the airbag apparatus of an outer-cover type, in which (A) is a general schematic drawing, (B) is an enlarged view of the vent cover, and (C) is an enlarged view of the opening and closing means having a valve.

As shown in FIG. 5(A), the airbag apparatus in the present invention includes an inflator (gas generator) 1 configured to generate gas under predetermined conditions, an airbag 2 being connected to the inflator 1 and configured to be inflated and deployed, and a retainer (not shown) configured to store the airbag 2, the airbag 2 includes a vent hole 3 formed on an outer shell of the airbag 2 and opening and closing means 4 configured to open and close the vent hole 3, the opening and closing means 4 is configured to maintain the vent hole 3 in the substantially closed state until the inflation and deployment of the airbag 2 are completed and bring the vent hole 3 into the fully-opened state before the flattening amount of the airbag 2 reaches the predetermined reference value.

The inflator 1 has a substantially column shape, is formed with a gas injection port on a side peripheral surface of a distal end portion wrapped by the airbag 2, and is stored and fixed to the retainer, not shown. The inflator 1 is connected to an ECU (electronic control unit), not shown, and is controlled on the basis of a measured value of an acceleration sensor or the like. When the ECU senses or estimates a collision or a sudden deceleration of the vehicle, the inflator 1 is ignited by an ignition current from the ECU, burns medicament stored in the interior of the inflator 1, and supplies gas to the airbag 2. The inflator 1 used in the airbag apparatus in the present invention may be the same one used in the airbag apparatus in the related art. However, the inflator 1 whose output or gas generating amount is smaller than those in the related art can be employed by improving the opening and closing means of the airbag 2. For example, the inflator used in the principal driver airbags in the related art has such specifications as an output of 200 kPa, a gas generating amount of 1.0 mol, and a weight of 390 g, while the inflator 1 having such specifications as an output of 190 kPa, a gas generating amount of 0.8 mol, and a weight of 310 g may be employed in the present invention. Also, the inflator used in the principal passenger airbags in the related art has such specifications as an output of 480 kPa, a gas generating amount of 3.2 mol, and a weight of 850 g, while the inflator 1 having such specifications as an output of 380 kPa, a gas generating amount of 2.8 mol, and a weight of 615 g may be employed in the present invention. These specifications are shown simply as examples, and the inflator 1 in the present invention is not limited to the specifications shown above. For example, the gas generating amount of the inflator 1 in the passenger airbag can be adjusted within a range from 2.3 to 2.8 mol.

The airbag 2 includes a rear panel 2a connected to the inflator 1 and a front panel 2b arranged on the side of the occupant. The rear panel 2a and the front panel 2b each have a substantially circular panel shape, and peripheral edge portions thereof are stitched from the inside. Therefore, the rear panel 2a and the front panel 2b form the outer shell as the internal pressure maintaining element of the airbag 2. The vent hole 3 is generally formed on the rear panel 2a. A tether 2c which forms the shape of the airbag 2 is provided in the interior of the airbag 2 in many cases. It is also possible to provide an inner panel which partitions the interior of the airbag 2 into a plurality of communicated chambers instead of the tether 2c.

The opening and closing means 4 includes a vent cover 4a which can cover the vent hole 3 from the outside, a tether 4b connected to the vent cover 4a and the interior of the airbag 2, and an insertion path 4c for the tether 4b formed in the airbag 2, and the tether 4b is connected to a position which allows the vent hole 3 to be brought into the fully-opened state before the flattening amount of the airbag 2 reaches the predetermined reference value. Although the tether 4b of being connected to the tether 2c (or the inner panel) has been described in FIG. 5(A), it may be connected to an inner surface (for example, the inside the front panel 2b) of the airbag 2 as shown in FIG. 7(A).

The tether 4b is connected to a position where the outer shell of the airbag 2 is retracted inward by a predetermined length ΔL in the inflation-and-deployment-completed state of the airbag 2 as shown in FIG. 5(A). The predetermined length ΔL is set, for example, to at least 10 mm, or at least 20 mm and, preferably to approximately 30 mm. In this manner, by connecting the tether 4b, the vent cover 4a can be pressed against the vent hole 3 by a tensile force of the tether 4b, and the vent hole 3 can be maintained to the substantially closed state until the inflation and deployment completion time Te of the airbag 2 or the opening starting time Ts of the vent hole. In the present invention, the term "substantially closed state" has a meaning including not only a state in which the vent hole 3 is completely sealed, but also a state of being about to close the vent hole 3 and a small-opening state in which the opening of the vent hole is intentionally restrained on the order of several percent on the assumption that gas leakage may occur to some extent. Also, conditions such as the length, the position of connection, and the predetermined length ΔL of the tether 4b may be modified variously depending on the thickness or the magnitude of the reference value and the threshold value of the airbag 2, and may be obtained analytically or holomorphically using a computer, or may be obtained empirically or experimentally.

The vent cover 4a includes a cover portion 41 formed into a shape larger than the vent hole 3 and a coupled portion 42 configured to connect the cover portion 41 and the tether 4b as shown in FIG. 5(B). An end portion of the cover portion 41 on the opposite side from the coupled portion 42 is fixed by being stitched to the outer shell (a surface of the rear panel 2a in this case) of the airbag 2. Although the cover portion 41 having a substantially triangle shape is shown here, the invention is not limited thereto, and arbitrary shapes such as rectangle, square, and circle may be selected. The coupled portion 42 functions as a stopper for preventing the vent cover 4a from being retracted excessively into the airbag 2. Therefore, it preferably has a width larger than the diameter of the insertion path 4c. An end portion of the tether 4b is stitched to the coupled portion 42.

In a case where the vent hole 3 can be brought into the fully-opened state before the flattening amount of the airbag 2 reaches the predetermined reference value only by the design of the tether 4b described above, the structure of the vent cover 4a may be designed in the same manner as those in the related art. However, instead of, or in addition to the design of the tether 4b, the cover portion 41 of the vent cover 4a may be formed to a size which allows the vent hole 3 to be the fully-opened state before the flattening amount of the airbag 2 reaches the predetermined reference value. More specifically, the cover portion 41 of the vent cover 4a is designed to a shape larger than the vent hole 3 by a predetermined width Δr. The predetermined width Δr is set, for example, to at least 10 mm and, preferably to approximately 20 mm. The size of the cover portion 41 of the vent cover 4a can be specified also by an area ratio. For example, the surface area of the cover portion 41 is designed to be a size about 2.5 times the surface area of the vent hole 3 in the fully-opened state. In this manner, by forming the cover portion 41 of the vent cover 4a to be a shape larger than the predetermined size, a negative pressure generated between the cover portion 41 and the surface of the airbag 2 can be used to delay the time to bring the vent hole 3 into the fully-opened state. Also, a value of the predetermined width Δr or the area ratio may be changed variously depending on the size of the vent hole 3 or the magnitude of the reference value and the threshold value, and may be obtained analytically or holomorphically using the computer, or may be obtained empirically or experimentally.

Also, as shown in FIG. 5(C), the opening and closing means 4 may be provided with a cylindrical valve (nozzle 4d) stitched to an edge portion of the vent hole 3. As described above, in order to bring the vent hole 3 into the fully-opened state before the flattening amount of the airbag 2 reaches the predetermined reference value, it can be adjusted by the connecting position of the tether 4b or the shape of the vent cover 4a. However, in the case of the opening and closing means 4 having the nozzle 4d, the vent hole 3 can be brought into the fully-opened state before the flattening amount of the airbag 2 reaches the predetermined reference value also by adjusting a height D of the nozzle 4d. In other words, when the height D of the nozzle 4d is sufficient, time until the nozzle 4d is discharged outside from the vent hole 3 by the pressure of the airbag 2 can be delayed. The height D is set, for example, to at least 20 mm and, preferably, to approximately 30 mm. Also, a value of the height D may be changed variously depending on the size of the vent hole 3 or the magnitude of the reference value and the threshold value, and may be obtained analytically or holomorphically using the computer, or may be obtained empirically or experimentally. In addition, activation of a deployment of the nozzle 4d can be delayed by stitching the nozzle 4d in a state of being folded or by devising the way of folding the nozzle 4d. It is also possible to employ a valve formed into a flap shape (for example, a shape such that the nozzle 4d is divided into a plurality of pieces in the circumferential direction) instead of the nozzle 4d.

Here, FIG. 6 is a drawing showing the structures of the airbag and the airbag apparatus of an inner-cover type, in which (A) is a general schematic drawing, and (B) is an enlarged view of the vent cover.

As shown in FIG. 6(A), the airbag apparatus in the present invention includes the inflator (gas generator) 1 configured to generate gas under the predetermined conditions, the airbag 2 being connected to the inflator 1 and configured to be inflated and deployed, and the retainer (not shown) configured to store the airbag 2, the airbag 2 includes the vent hole 3 formed on the outer shell of the airbag 2 and opening and closing means 5 configured to open and close the vent hole 3, the opening and closing means 5 is configured to maintain the vent hole 3 in the substantially closed state until the inflation and deployment of the airbag 2 are completed and bring the vent hole 3 into the fully-opened state before the flattening amount of the airbag 2 reaches the predetermined reference value. The inflator 1, the airbag 2, and the vent hole 3 are the same as those of the outer-cover type shown in FIG. 5, so that the overlapped description is omitted here.

The opening and closing means 5 includes a vent cover 5a which can cover the vent hole 3 from the inside, a tether 5b connected to the vent cover 5a and the interior of the airbag 2, and an insertion path 5c for the tether 5b formed in the airbag 2, and the tether 5b is connected to the position which allows the vent hole 3 to be brought into the fully-opened state before the flattening amount of the airbag 2 reaches a predetermined reference value. Although the tether 5b of being connected to the tether 2c (or the inner panel) has been described in FIG. 6(A), it may be connected to the inner surface (for example, the inside the front panel 2b) of the airbag 2 as shown in FIG. 7(B).

The insertion path 5c is a space defined by stitching both end portions 51a, 51a of a plate-shaped guide member 51 from the inside of the airbag 2 as shown in FIG. 6(B). In addition, in the present invention, a substantially center portion 51b of the guide member 51 is also stitched from the inside of the airbag 2. In contrast, the tether 5b is formed with a notched portion 52, and a stitched portion of the substantially center portion 51b of the guide member 51 is arranged at the notched portion 52. Therefore, the tether 5b is inserted into the insertion path 5c avoiding the stitched portion of the substantially center portion 51b of the guide member 51. In this configuration, even though the tether 5b is pulled inward of the airbag 2, the movement of the tether 5b can be stopped by the notched portion 52 locked by the stitched portion of the substantially center portion 51b of the guide member 51. Therefore, the tether 5b can be connected to the position where the outer shell of the airbag 2 is retracted inward by the predetermined length ΔL in the inflation-and-deployment-completed state in the same manner as the case of the outer-cover type. The notched portion 52 may be formed partially on the tether 5b as shown in the drawing, or may be notched to an end portion which is connected to the side of the airbag 2. Also, in the same manner as the case of the outer-cover type, the vent hole 3 can be brought into the fully-opened state before the flattening amount of the airbag 2 reaches the predetermined reference value by adjusting the size (the predetermined width Δr or the area ratio) of the vent cover 5a.

Subsequently, a modification of the embodiment shown in FIG. 5 and FIG. 6 will be described. FIG. 7 is a first modification of the embodiment shown in FIG. 5 and FIG. 6, in which (A) shows the outer-cover type, and (B) shows the inner-cover type. Also, FIG. 8 is a second modification of the embodiment shown in FIG. 5, in which (A) is a configuration drawing, and (B) to (D) are operational drawings. In the respective drawings, the same components as those in the embodiments described above are designated by the same reference numerals and overlapped description will be omitted.

The first modification shown in FIG. 7(A) is configured in such a manner that the tether 4b is connected to the inner surface of the airbag 2 (for example, the inside the front panel 2b) in the airbag and the airbag apparatus of the outer-cover type shown in FIG. 5(A). Also, the first modification shown in FIG. 7(B) is configured in such a manner that the tether 5b is connected to the inner surface of the airbag 2 (for example, the inside the front panel 2b) in the airbag and the airbag apparatus of the inner-cover type shown in FIG. 6(A). Although the tethers 4b, 5b are connected to positions opposing to an occupant protecting surface in the inner surface of the front panel 2b in this example, they may be connected to any positions as long as it is the inner surface of the airbag 2. For example, the tethers 4b, 5b may be connected to an inner surface of the rear panel 2a or may be connected to a stitched portion between the rear panel 2a and the front panel 2b. In this manner, by connecting the tethers 4b, 5b to the inner surface of the airbag 2, the vent covers 4a, 5a can be pressed against the vent hole 3 by the tensile forces of the tethers 4b, 5b and the vent hole 3 can be maintained to the substantially closed state until the inflation and deployment completion time Te of the airbag 2 or the opening starting time Ts of the vent hole. Although portions where the tethers 4b, 5b retract the airbag 2 inwardly are located on the side of the occupant protecting surface in the first modification shown in FIGS. 7(A) and (B), it is changed depending on the conditions such as the positions of connection of the tethers 4b, 5b or the pressure in the airbag 2. Therefore, the portions where the tethers 4b, 5b retract the airbag 2 inwardly may be the side of the vent hole 3 as shown in FIG. 5(A) and FIG. 6(B), or may be both sides of the tethers 4b, 5b.

The second modification shown in FIG. 8(A) is configured in such a manner that an auxiliary vent cover 43 connected to the outer shell of the airbag 2 is arranged between the vent hole 3 and the vent cover 4a. More specifically, the auxiliary vent cover 43 includes a cover portion 43a which can cover the vent hole 3, a fixed end 43b stitched to the surface of the rear panel 2a covered by the cover portion 41 of the vent cover 4a, and an unfixed free end 43c. The cover portion 43a is formed into, for example, a substantially fan shape as shown in the drawing. However, the cover portion 43a is not specifically limited to such a shape, and may be of any shape as long as it has a size which can cover the vent hole 3. The fixed end 43b is arranged on the side of the vent cover 4a opposite from the joint portion 41a (that is, the side of the coupled portion 42). Therefore, the vent hole 3 is covered doubly so as to be folded over one another from both sides by the cover portions 41, 43a of the vent cover 4a and the auxiliary bent cover as shown in the drawing.

Subsequently, an operation of the second modification will be described. FIG. 8(B) shows a normal state in which the vent hole 3 is covered by the vent cover 4a and the auxiliary vent cover 43. As shown in FIG. 8(C), when the inflation and deployment of the airbag 2 are completed and the tether 4b starts to be loosened, the vent cover 4a moves gradually away from the vent hole 3. However, since the free end 43c of the cover portion 43a of the auxiliary vent cover 43 is held by the vent cover 4a, the vent hole 3 does not brought into the fully-opened state, and may be maintained in the substantially closed state. As shown in FIG. 8(D), when the tether 4b is loosened and the free end 43c of the cover portion 43a of the auxiliary vent cover 43 is released from the vent cover 4a, the vent hole 3 is brought into the fully-opened state. Therefore, by the arrangement of the auxiliary vent cover 43, the time until the vent hole 3 is fully-opened can be delayed. Although a case of the outer-cover type has been described in this example, the above-described second modification may be applied to the airbag and the airbag apparatus of the inner-cover type shown in FIG. 6(A).

FIG. 9 is a general schematic drawing of the airbag and the airbag apparatus in which a second chamber is formed outside the airbag 2, in which (A) shows a case where the second chamber is formed over an entire surface of the rear panel 2a, and (B) shows a case where the second chamber is formed on a part of the rear panel 2a.

The airbag apparatus shown in FIG. 9(A) includes the inflator (gas generator) 1 configured to generate gas under the predetermined conditions, the airbag 2 being connected to the inflator 1 and configured to be inflated and deployed, and the retainer (not shown) configured to store the airbag 2, the airbag 2 includes the vent hole 3 formed on the outer shell of the airbag 2 and opening and closing means 6 configured to open and close the vent hole 3, the opening and closing means 6 includes a vent cover 6a which can cover the vent hole 3, a tether 6b connected to the vent cover 6a and the interior of the airbag 2, and a second chamber 6c formed outside the vent hole 3 and having a second vent hole 61. In this manner, by forming the second chamber 6c, gas discharged from the vent hole 3 stays in the interior of the second chamber 6c once to maintain the internal pressure of the airbag 2 temporarily, so that the timing of discharge of the gas from the entire airbag 2 including the second chamber 6c can be delayed. Therefore, with the opening and closing means 6 as well, the same effect obtained when the vent hole 3 is maintained in the substantially closed state until the inflation and deployment of the airbag 2 are completed, and then the vent hole 3 is brought into the fully-opened state before the flattening amount of the airbag 2 reaches the predetermined reference value is demonstrated. Also, setting of the threshold value is easily accommodated by the capacity of the second chamber 6c, the way of folding, increase of the stitched portion, and so on. The inflator 1, the airbag 2, and the vent hole 3 are the same as those of the outer-cover type shown in FIG. 5, so that the overlapped description is omitted here.

In the airbag apparatus shown in FIG. 9(A), an outer panel 62 having a substantially circular shape is disposed outside the rear panel 2a, and is stitched and fixed by being pinched at the stitched portion between the rear panel 2a and the front panel 2b. Therefore, it means that the second chamber 6c is formed between the rear panel 2a and the outer panel 62. The outer panel 62 is formed with the second vent hole 61 for discharging gas flowed into the second chamber 6c. Conditions such as the size of the outer panel 62 (the capacity of the second chamber 6c) or the size, the number, or the positions of the second vent hole 61 may be varied variously depending on the size of the airbag 2, the size of the vent hole 3, the magnitude of the reference value and the threshold value, or the like which may obtained analytically or holomorphically using the computer, or may be obtained empirically or experimentally.

As shown in FIG. 9(A), the vent hole 6a is stitched so as to form a discharge air flow channel outside the vent hole 3, and the tether 6b is connected to the vent cover 6a through the vent hole 3. Here, as regards the vent cover 6a or the tether 6b, it is not necessary to bring the vent hole 3 into the substantially closed state until the inflation and the deployment of the airbag 2 are completed, and then bring the vent hole 3 into the fully-opened state before the flattening amount of the airbag 2 reaches the predetermined reference value, so that the simple structure as shown in the drawing may be employed. As a matter of course, the structures shown in FIG. 5 to FIG. 8 may be employed instead of the vent cover 6a and the tether 6b shown in FIG. 9(A). Also, instead of the vent cover 6a, the tether 6b may be joined directly to the outer panel 62 to give the function of the vent cover 6a to the outer panel 62. In this case, the number of components of the airbag 2 may be reduced, so that the weight reduction of the airbag 2 is achieved.

The airbag apparatus shown in FIG. 9(B) includes the inflator (gas generator) 1 configured to generate gas under the predetermined conditions, the airbag 2 being connected to the inflator 1 and configured to be inflated and deployed, and the retainer (not shown) configured to store the airbag 2, the airbag 2 includes a vent hole 3 formed on the outer shell of the airbag 2 and opening and closing means 7 configured to open and close the vent hole 3, the opening and closing means 7 includes a second chamber 7a being formed outside the vent hole 3 and having a second vent hole 71, and a tether 7b connected to an outer panel 72 which defines the second chamber 7a and the interior of the airbag 2. In this configuration as well, the same effect as the airbag apparatus in FIG. 9(A) can be demonstrated. The inflator 1, the airbag 2, and the vent hole 3 are the same as those of the outer-cover type shown in FIG. 5, so that the overlapped description is omitted here.

In the airbag apparatus shown in FIG. 9(B), the outer panel 72 is disposed partly outside the rear panel 2a, and an outer periphery of the outer panel 72 is stitched and fixed to the rear panel 2a. Therefore, it means that the second chamber 7a is formed between the rear panel 2a and the outer panel 72. The outer panel 72 is formed with the second vent hole 71 for discharging gas flowed into the second chamber 7a. Conditions such as the size of the outer panel 72 (the capacity of the second chamber 7a) or the size, the number, or the positions of the second vent hole 71 may be varied variously depending on the size of the airbag 2, the size of the vent hole 3, or the magnitude of the reference value and the threshold value, which may obtained analytically or holomorphically using the computer, or may be obtained empirically or experimentally.

Also, as shown in FIG. 9(B), the tether 7b is directly joined to the outer panel 72 through the vent hole 3, and the outer panel 72 is used as the bent cover. Therefore, the number of components of the airbag 2 may be reduced, so that the weight reduction of the airbag 2 is achieved. As a matter of course, the bent covers as shown in FIG. 9(A) and FIG. 5 to FIG. 8 can be arranged as needed.

Although the case where the vent hole 3 is formed on the airbag 2 has been described above, the present invention can be applied to the case where the vent hole is formed on the retainer. Here, FIG. 10 shows an embodiment in which the vent hole is formed on the retainer, in which (A) shows a substantially closed state, and (B) shows a fully-opened state. In the respective drawings, the same components as those in the embodiments described above are designated by the same reference numerals and overlapped description will be omitted.

The airbag apparatus shown in FIG. 10(A) and FIG. 10(B) is an airbag apparatus including the inflator 1 configured to generate gas under the predetermined conditions, the airbag 2 being connected to the inflator 1 and configured to be inflated and deployed, and a retainer 8 configured to store the airbag 2 and including a vent hole 81 formed on the retainer 8, and opening and closing means 9 configured to open and close the vent hole 81, the opening and closing means 9 is configured to maintain the vent hole 81 in the substantially closed state until the inflation and deployment of the airbag 2 are completed and bring the vent hole 81 into the fully-opened state before the flattening amount of the airbag 2 reaches the predetermined reference value.

The retainer 8 is locked on a cover member 10 which is capable of storing and inflating and deploying the airbag 2 by a hook 82. The retainer 8 is fixed by gripping a flange portion 1a of the inflator 1 by a fixing member 11 such as a bolt and a nut. Furthermore, the retainer 8 includes a cylindrical portion extending outward. The cylindrical portion is configured to communicate with the interior of the airbag 2 via an opening 2d formed on the airbag 2. Also, the opening and closing means 9 includes a lid member 9a slidably arranged in the interior of the cylindrical portion and a tether 9b coupling the lid member 9a and the inner surface of the airbag 2. As shown in FIG. 10(A), the lid member 9a arranged in the cylindrical portion is configured so as not to be retracted into the airbag 2 by a holding panel member 12 to be fixed in the inner side of the retainer 8 by the fixing member 11. In other words, the holding panel member 12 includes an opening having a diameter smaller than the lid member 9a, and is fixed to the retainer 8 by the fixing member 11 in a state in which the opening is substantially aligned with openings of the cylindrical portion and the airbag 2, and functions as a stopper of the lid member 9a. The tether 9b is set under the same conditions as the tethers 4b, 5b shown in FIG. 5(A) and FIG. 6(B). Then, for example, as shown in FIG. 10(B), when an occupant M collides with the airbag 2, the tether 9b is loosened, and the lid member 9a slides outward in the interior of the cylindrical portion by the internal pressure of the airbag 2. When the tether 9b is further loosened, and the tether 9b is loosened significantly in comparison with a length H of the cylindrical portion, the lid member 9a is discharged outward from the cylindrical portion, and the vent hole 81 is brought into the fully-opened state. Therefore, by adjusting the length H of the cylindrical portion, timing to bring the vent hole 81 into the fully-opened state can be adjusted so as to match the type, the size, and so on of the airbag.

Finally, the relationship between the gas generating amount (mol) of the inflator 1 and the peripheral diameter (mm) of the airbag 2 will be described. Here, FIG. 11 is a drawing showing a relationship between head acceleration (m/s$^2$) and the peripheral diameter (mm) of the airbag, in which (A) shows a case where the gas generating amount is 0.5 mol, and (B) shows a case where the gas generating amount is 0.65 mol. Also, FIG. 12 is a drawing showing the relationship between the head acceleration (m/s$^2$) and the peripheral diameter (mm) of the airbag, in which (A) shows a case where the gas generating amount is 0.8 mol, and (B) shows a case where the gas generating amount is 0.9 mol. In the respective drawings, the peripheral diameter of the airbag 2 means the distance from the center to an outer edge of the airbag 2 when it is deployed on a plane (which corresponds to a radius if it is a circular shape) in a state in which the rear panel 2a and the front panel 2b are stitched together. Also, a vertical axis represents the head acceleration (m/s$^2$), and a lateral axis represents the peripheral diameter (mm) of the airbag 2. The head acceleration means the acceleration of the head portion generated when the occupant collides with the airbag 2.

If the peripheral diameter of the airbag 2 is increased in case where the gas generating amount of the inflator 1 is constant, the capacity of the airbag 2 is increased correspondingly, so that the internal pressure of the airbag 2 is lowered. Therefore, in the airbag in the related art, when the gas generating amount of the inflator is constant, the head acceleration tends to increase as the peripheral diameter increases. In contrast, according to the airbag and the airbag apparatus in the present invention described above, with a configuration such that the impact absorbency of the airbag 2 does not lowered abruptly even when the occupant comes into contact therewith after the completion of the inflation and deployment of the airbag 2, the impact of the occupant can be absorbed even when the maximum value Fmax of the impact absorbency is set to be low and, consequently, the inflator whose output or the gas generating amount is small can be used for the airbag apparatus. Furthermore, if the peripheral diameter of the airbag 2 can be reduced, the airbag apparatus can further be downsized, reduced in cost, and reduced in weight. Therefore, in view of the fact that the gas generating amount of the inflator in the related art is on the order of 0.9 to 1.0 mol, the airbag apparatus employing the airbag 2 in the present invention shown in FIG. 5(A) was used for performing a simulation of a case where the gas generating amount of the inflator 1 is 0.5 mol, 0.65 mol, 0.8 mol, and 0.9 mol, and the relationship between the head acceleration and the peripheral diameter was considered.

As shown in FIG. 11(A), when the gas generating amount of the inflator 1 was 0.5 mol, the drop of the head acceleration was observed when the peripheral diameter of the airbag 2 is in a range from 590 to 603 mm (a range interposed between two alternate chain lines). With the peripheral diameter of 603 mm or larger, the head acceleration was abruptly increased until it reaches 610 mm, and then a substantially constant state was observed. In general, the lower the numerical value of the head acceleration, the more it is preferable. However, in the airbag in the related art, a state in which the head acceleration is not higher than, for example, 600 m/s$^2$ is considered as a reference. From this point of view, the airbag apparatus in the present invention satisfies the reference in the related art when the peripheral diameter of the airbag 2 is in a range from 580 to 650 mm. However, the lower the numerical value of the head acceleration, the more it is preferable, and hence a state in which "the head acceleration is not higher than 560 m/s$^2$" which is a stricter condition than in the related art is considered as a reference in the present invention. Therefore, when the gas generating amount of the inflator 1 shown in FIG. 11(A) is 0.5 mol, the peripheral diameter of the airbag 2 is preferably set to a value not higher than approx. 607 mm (a hatched range in the drawing). Further preferably, the peripheral diameter of the airbag 2 is set to a range in which an effective drop of the head acceleration was observed, that is, a range from 590 to 603 mm. The reference (head acceleration: 560 m/s$^2$) in the present invention described above is simply an example, and may be any value as long as it is smaller than 600 m/s$^2$.

As shown in FIG. 11(B), when the gas generating amount of the inflator 1 was 0.65 mol, the drop of the head acceleration was observed when the peripheral diameter of the airbag 2 is in a range from 600 to 625 mm (a range interposed between two alternate chain lines). With the peripheral diameter of 625 mm or larger, the head acceleration was increased as a result. Also, the head acceleration was not higher than 600 m/s$^2$ when the peripheral diameter of the airbag 2 is in a range from 590 to 660 mm. Considering here the condition "the head acceleration is not higher than 560 m/s$^2$" as an index, when the gas generating amount of the inflator 1 is 0.65 mol, the peripheral diameter of the airbag 2 is preferably set to a value not higher than approx. 660 mm (a hatched range in the drawing). Further preferably, the peripheral diameter of the airbag 2 is set to a range in which the effective drop of the head acceleration was observed, that is, a range from 600 to 625 mm.

As shown in FIG. 12(A), when the gas generating amount of the inflator 1 was 0.8 mol, the drop of the head acceleration was observed when the peripheral diameter of the airbag 2 is in a range from 630 to 655 mm (a range interposed between two alternate chain lines). With the peripheral diameter of 655 mm or larger, the head acceleration was increased as a result. Also, the head acceleration was not higher than 600 m/s$^2$ when the peripheral diameter of the airbag 2 is in a range from 610 to 680 mm. Considering here the condition "the head acceleration is not higher than 560 m/s$^2$" as the index, in a case where the gas generating amount of the inflator 1 is 0.8 mol, the peripheral diameter of the airbag 2 is preferably set to a value not higher than approx. 675 mm (a hatched range in the drawing). Further preferably, the peripheral diameter of the airbag 2 is set to a range in which the effective drop of the head acceleration was observed, that is, a range from 630 to 655 mm.

As shown in FIG. 12(B), when the gas generating amount of the inflator 1 was 0.9 mol, the drop of the head acceleration was observed when the peripheral diameter of the airbag 2 is in a range from 660 to 682 mm (a range interposed between two alternate chain lines). With the peripheral diameter of 682 mm or larger, the head acceleration was temporarily increased as a result. Also, the head acceleration was not higher than 600 m/s$^2$ and was not higher than 560 m/s$^2$ when the peripheral diameter of the airbag 2 is in a range from 650 to 700 mm. From the result in FIG. 12(B), in a case where the gas generating amount of the inflator 1 is 0.9 mol, a good result such that the head acceleration becomes 500 m/s$^2$ or lower when the peripheral diameter of the airbag 2 is in a range from 650 mm to 700 mm was obtained. It is further preferable to set the peripheral diameter of the airbag 2 to a range in which the effective drop of the head acceleration was observed, that is, in a range from 660 to 682 as a matter of course.

In conjunction with FIG. 11 and FIG. 12, the description has been given from the view point "how the peripheral diameter of the airbag 2 is to be set with respect to the gas generating amount of the inflator 1", while it is also possible to describe using the same result from the view point "how the gas generating amount of the inflator 1 is to be selected with respect to the peripheral diameter of the airbag 2". Here, FIG. 13 is a drawing showing the relationship between the head acceleration (m/s$^2$) and the peripheral diameter (mm) of the airbag in cases where the gas generating amount of the inflator is 0.5 mol, 0.65 mol, 0.8 mol, and 0.9 mol. A graph in FIG. 13 shows the graphs in FIG. 11 and FIG. 12 together.

As shown in FIG. 13, the graph of the case where the gas generating amount of the inflator 1 is 0.5 mol and the graph of the case where the gas generating amount of the inflator 1 is 0.65 mol are overlapped with each other where the peripheral diameter of the airbag 2 is about 600 mm. Also, the graph of the case where the gas generating amount of the inflator 1 is 0.65 mol and the graph of the case where the gas generating amount of the inflator 1 is 0.8 mol are close to each other where the peripheral diameter of the airbag 2 is about 615 mm. Also, the graph of the case where the gas generating amount of the inflator 1 is 0.8 mol and the graph of the case where the gas generating amount of the inflator 1 is 0.9 mol are overlapped with each other where the peripheral diameter of the airbag 2 is about 655 mm. Therefore, by setting the gas generating amount of the inflator 1 to a large amount in the peripheral diameter of the airbag 2 where the respective graphs are overlapped with each other or close to each other, the head acceleration can be maintained to a low level. In other words, by setting the number of moles of the inflator 1 to 0.5 mol when the peripheral diameter of the airbag 2 is 600 mm or smaller, the number of moles of the inflator 1 to 0.65 mol when the peripheral diameter of the airbag 2 is 600-615 mm, the number of moles of the inflator 1 to 0.8 mol when the peripheral diameter of the airbag 2 is 616-655 mm, and the number of moles of the inflator 1 to 0.9 mol when the peripheral diameter of the airbag 2 is 655 mm or higher, the downsizing, cost reduction, and weight reduction of the gas generator and the airbag are effectively achieved while improving the impact absorbency of the airbag.

The numerical values of the gas generating amount of the inflator 1 used in the description in conjunction with FIG. 11 to FIG. 13 (0.5 mol, 0.65 mol, 0.8 mol, and 0.9 mol) are examples of representative numerical values, and by performing the simulation in the same range from 0.5 to 0.9 mol, the peripheral diameter of the airbag 2 suitable for the gas generating amount of the inflator 1 can be set, and the gas generating amount of the inflator 1 suitable for the peripheral diameter of the airbag 2 can be set. For example, the value 0.5 mol can be defined as a representative value in a range from 0.45 to 0.55 mol, the value 0.65 mol as a representative value in a range from 0.6 to 0.7 mol, the value 0.8 mol as a representative value in a range from 0.75 to 0.85 mol, and the value 0.9 mol as a representative value in a range from 0.85 to 0.95 mol. Therefore, in FIG. 11(A), it is also possible to configure the peripheral diameter of the airbag 2 to be 580-607 mm or 590-603 mm in a case where the gas generating amount of the inflator 1 is 0.55 mol. Also, in FIG. 11(B), it is also possible to configure the peripheral diameter of the airbag 2 to be 590-660 mm or 600-625 mm in a case where the gas generating amount of the inflator 1 is 0.6-0.7 mol. Therefore, in FIG. 12(A), it is also possible to configure the peripheral diameter of the airbag 2 to be 610-675 mm or 630-655 mm in a case where the gas generating amount of the inflator 1 is 0.75-0.85 mol. Also, in FIG. 12(B), it is also possible to configure the peripheral diameter of the airbag 2 to be 650-

700 mm or 60-682 mm in a case where the gas generating amount of the inflator 1 is 0.85-0.95 mol. Furthermore, in FIG. 13, it is also possible to configure the gas generating amount of the inflator 1 to be 0.45-0.55 mol when the peripheral diameter of the airbag 2 is 600 mm or lower, the gas generating amount of the inflator 1 to be 0.6-0.7 mol when the peripheral diameter of the airbag 2 is 600-615 mm, the gas generating amount of the inflator 1 to be 0.75-0.85 mol when the peripheral diameter of the airbag 2 is 615-655 mm, and the gas generating amount of the inflator 1 to be 0.85-0.95 mol when the peripheral diameter of the airbag 2 is 655 mm or higher.

Subsequently, the relation between the gas generating amount (mol) of the inflator 1 and the peripheral diameter (mm) of the airbag 2 described above is replaced by a coefficient α expressed by (outer periphery of the airbag)/(gas generating amount of the inflator) for making a study. Here, FIG. 14 is a comparative drawing of the coefficient α, in which (A) shows a case of the airbag apparatus in the related art, (B) shows a case of the airbag apparatus in the present invention (a head acceleration of 560 m/s$^2$), and (C) shows a case of the airbag apparatus (best mode) of the present invention.

As shown in FIG. 14(A), in the airbag apparatus in the related art, the peripheral diameter of the airbag is generally set to 590 to 650 mm in the case where the gas generating amount of the inflator is 0.9 mol. The peripheral diameter of the airbag is generally set to 590 to 710 mm in a case where the gas generating amount of the inflator is 1 mol. When the coefficient α is obtained from these numerical values, the coefficient α becomes 656 to 722 in the case where the gas generating amount of the inflator is 0.9 mol, and the coefficient α becomes 590 to 710 in the case where the gas generating amount of the inflator is 1 mol. Therefore, in the case of the inflator in which the gas generating amount generally used in the airbag apparatus in the related art is 0.9 to 1 mol, the coefficient α becomes 590 to 722.

In contrast, in the airbag apparatus in the present invention, with referent to FIG. 11 and FIG. 12, the gas generating amount of the inflator 1 and the peripheral diameter of the airbag 2 when the head acceleration becomes 560 m/s$^2$ or lower are expressed as shown in FIG. 14(B). In other words, the peripheral diameter of the airbag 2 is 580 to 607 mm in a case where the gas generating amount of the inflator 1 is 0.5 mol, the peripheral diameter of the airbag 2 is 590 to 660 mm in a case where the gas generating amount of the inflator 1 is 0.65 mol, the peripheral diameter of the airbag 2 is 610 to 675 mm in the case where the gas generating amount of the inflator 1 is 0.8 mol, and the peripheral diameter of the airbag 2 is 650 to 700 mm in the case where the gas generating amount of the inflator 1 is 0.9 mol. When the coefficient α is obtained from these results, the coefficient α is 1160 to 1214 in the case where the gas generating amount of the inflator 1 is 0.5 mol, the coefficient α is 908 to 1015 in the case where the gas generating amount of the inflator 1 is 0.65 mol, the coefficient α is 763 to 844 in the case where the gas generating amount of the inflator 1 is 0.8 mol, and the coefficient α is 722 to 778 in the case where the gas generating amount of the inflator 1 is 0.9 mol. Therefore, in the case of the inflator 1 in which the gas generating amount generally used in the airbag apparatus in the present invention is 0.5 to 0.9 mol, the coefficient α becomes 722 to 1214. From this result, in the airbag apparatus in the present invention, the coefficient α can be set to a value larger than that in the related art, and the downsizing, cost reduction, and weight reduction of the gas generator and the airbag are effectively achieved while maintaining the impact absorbency of the airbag 2.

In the respective drawings of FIG. 11 and FIG. 12, it is assumed that the range in which the head acceleration can be set effectively to a low value (the range interposed between the alternate chain lines) is the best mode of the peripheral diameter of the airbag 2 with respect to the respective gas generating amounts. The gas generating amount of the inflator 1 in such best mode and the peripheral diameter of the airbag 2 are expressed as shown in FIG. 14(C). In other words, the peripheral diameter of the airbag 2 is 590 to 603 mm in the case where the gas generating amount of the inflator 1 is 0.5 mol, the peripheral diameter of the airbag 2 is 600 to 625 mm in the case where the gas generating amount of the inflator 1 is 0.65 mol, the peripheral diameter of the airbag 2 is 630 to 655 mm in the case where the gas generating amount of the inflator 1 is 0.8 mol, and the peripheral diameter of the airbag 2 is 660 to 682 mm in the case where the gas generating amount of the inflator 1 is 0.9 mol. When the coefficient α is obtained from these results, the coefficient α is 1180 to 1206 in the case where the gas generating amount of the inflator 1 is 0.5 mol, the coefficient α is 923 to 962 in the case where the gas generating amount of the inflator 1 is 0.65 mol, the coefficient α is 788 to 819 in the case where the gas generating amount of the inflator 1 is 0.8 mol, and the coefficient α is 733 to 758 in the case where the gas generating amount of the inflator 1 is 0.9 mol. Therefore, in the case of the inflator 1 in which the gas generating amount generally used in the airbag apparatus (best mode) in the present invention is 0.5 to 0.9 mol, the coefficient α becomes 733 to 1206. From this result, it is understood that the coefficient α can be set within a range from 733 to 1206 in the case of the airbag apparatus in the present invention.

The present invention is not limited to the embodiments described above, and may be applied to all the airbags having the vent hole, so that various modifications may be made without departing the scope of the present invention. For example, the invention can be applied also to a curtain airbag apparatus, a knee airbag apparatus, a pedestrian airbag apparatus, and so on, as a matter of course.

BRIEF DESCRIPTION OF THE DRAWINGS

FIG. 1 is a drawing for explaining an operation of a vent hole of an airbag apparatus in a first embodiment of the present invention, in which (A) shows a relationship between inflation and deployment time of an airbag and an opening of the vent hole, and (B) shows a relationship between a stroke of the airbag and an impact absorbency.

FIG. 2 is an explanatory drawing of a set range of a reference value, in which (A) shows a case of a driver airbag, and (B) shows a case of a passenger airbag.

FIG. 3 is a drawing for explaining an operation of a vent hole of an airbag apparatus in a second embodiment of the present invention, in which (A) shows the relationship between the inflation and deployment time of the airbag and the opening of the vent hole, and (B) shows the relationship between the stroke of the airbag and the impact absorbency.

FIG. 4 is an explanatory drawing of a set range of a threshold value, in which (A) shows a case of the driver airbag, and (B) shows a case of the passenger airbag.

FIG. 5 is a drawing showing the structures of the airbag and the airbag apparatus of an outer-cover type, in which (A) is a general schematic drawing, (B) is an enlarged view of the vent cover, and (C) is an enlarged view of opening and closing means having a valve.

FIG. 6 is a drawing showing the structures of the airbag and the airbag apparatus of an inner-cover type, in which (A) is a general schematic drawing, (B) is an enlarged view of the vent cover.

FIG. 7 is a first modification of the embodiment shown in FIG. 5 and FIG. 6, in which (A) shows the outer-cover type, and (B) shows the inner-cover type.

FIG. 8 is a second modification of the embodiment shown in FIG. 5, in which (A) is a configuration drawing, and (B) to (D) are operational drawings.

FIG. 9 is a general schematic drawing of the airbag and the airbag apparatus in which a second chamber is formed outside the airbag, in which (A) shows a case where the second chamber is formed over an entire surface of a rear panel and (B) shows a case where the second chamber is formed on part of the rear panel.

FIG. 10 shows an embodiment in which the vent hole is formed on a retainer, in which (A) shows a substantially closed state, and (B) shows a fully-opened state.

FIG. 11 is a drawing showing a relation between a gas generating amount (mol) of an inflator and a peripheral diameter (mm) of the airbag, in which (A) shows a case where the gas generating amount is 0.5 mol, (B) shows a case where the gas generating amount is 0.65 mol.

FIG. 12 is a drawing showing the relationship between the gas generating amount (mol) of the inflator and the peripheral diameter (mm) of the airbag, in which (A) shows a case where the gas generating amount is 0.8 mol, (B) shows a case where the gas generating amount is 0.9 mol.

FIG. 13 is a drawing showing a relationship between a head acceleration ($m/s^2$) and the peripheral diameter (mm) of the airbag in cases where the gas generating amounts of the inflator are 0.5 mol, 0.65 mol, 0.8 mol, and 0.9 mol.

FIG. 14 is a comparative drawing of a coefficient α, in which (A) shows a case of an airbag apparatus in the related art, and (B) shows a case of the airbag apparatus in the present invention.

FIG. 15 is a drawing for explaining an operation of a vent hole of the airbag apparatus in the related art, in which (A) shows a relationship between inflation and deployment time of the airbag and an opening of the vent hole, and (B) shows a relationship between a stroke of the airbag and an impact absorbency.

The invention claimed is:

1. An airbag configured to be inflated and deployed by being supplied with gas into the interior thereof comprising:
a vent hole formed on an outer shell of the airbag; and
opening and closing means configured to open and close the vent hole,
wherein the opening and closing means is configured to maintain the vent hole in a substantially closed state until the inflation and deployment of the airbag are completed, and bring the vent hole into a fully-opened state before a flattening amount of the airbag reaches a predetermined reference value,
wherein the opening and closing means includes a vent cover which can cover the vent hole, a tether connected to the vent cover and the interior of the airbag, and an insertion path for the tether formed in the airbag, and the tether is connected to a position which allows the vent hole to be brought into the fully-opened state before the flattening amount of the airbag reaches the predetermined reference value, and
wherein the tether is connected to a position where the outer shell of the airbag assumes a state of being retracted inward by a predetermined length in an inflation-and-deployment-completed state of the airbag.

2. The airbag according to claim 1, wherein the predetermined reference value is set to a value corresponding to the flattening amount of the airbag in a thickness direction that falls within a range from 10% to 50% from the inflation-and-deployment-completed state of the airbag, and within a range from 50 mm to 150 mm from the inflation-and-deployment-completed state of the airbag.

3. The airbag according to claim 1, wherein the opening and closing means is configured in such a manner that the vent hole is maintained in the substantially closed state until the flattening amount of the airbag reaches a threshold value which is smaller than the predetermined reference value.

4. The airbag according to claim 3, wherein the threshold value is set to any value from among a value corresponding to a flattening amount of the airbag in a thickness direction falls within a range from 5% to 25% from the inflation-and-deployment-completed state of the airbag, a value corresponding to the flattening amount of the airbag in the thickness direction falls within a range from 25 mm to 75 mm from the inflation-and-deployment-completed state of the airbag, or a value half the predetermined reference value.

5. The airbag according to claim 1, wherein the predetermined length is at least 20 mm or at least 10 mm.

6. The airbag according to claim 1, wherein the vent cover is arranged inside the airbag and the insertion path is defined by a guide member which is stitched to the inside of the airbag at both end portions thereof and a part therebetween, and the tether is inserted into the insertion path so as to avoid a stitched portion of the guide member.

7. The airbag according to claim 1, wherein the vent cover is formed into a size which allows the vent hole to be brought into the fully-opened state before the flattening amount of the airbag reaches the predetermined reference value.

8. The airbag according to claim 7, further comprising an auxiliary vent cover connected to the outer shell of the airbag between the vent hole and the vent cover.

9. The airbag according to claim 7, wherein the vent cover has a shape larger than the vent hole by a predetermined width.

10. The airbag according to claim 9, wherein the predetermined width is at least 10 mm.

11. The airbag according to claim 7, wherein the vent cover has a surface area of at least 2.5 times the surface area of the vent hole in the fully-opened state.

12. The airbag according to claim 1, wherein the vent cover can cover the vent hole from the outside, and wherein the opening and closing means further includes a flap-shaped or a cylindrical valve stitched to an edge portion of the vent hole, and the valve may be formed to have a height which allows the vent hole to be brought into the fully-opened state before the flattening amount of the airbag reaches the predetermined reference value.

13. The airbag according to claim 12, wherein the height of the valve is at least 20 mm.

14. An airbag apparatus comprising: a gas generator configured to generate gas under predetermined conditions; an airbag configured to be inflated and deployed by being connected to the gas generator; and a retainer configured to store the airbag, wherein the airbag is the airbag according to claim 1.

15. The airbag apparatus according to claim 14, wherein the airbag is a driver airbag, and a gas generating amount of the gas generator is less than 1 mol, or an output of the gas generator is less than 200 kPa.

16. The airbag apparatus according to claim 14, wherein a peripheral diameter of the airbag is 580-607 mm or 590-603 mm when the gas generating amount of the gas generator is 0.45-0.55 mol.

17. The airbag apparatus according to claim 14, wherein the peripheral diameter of the airbag is 590-660 mm or 600-625 mm when the gas generating amount of the gas generator is from 0.6-0.7 mol.

18. The airbag apparatus according to claim 14, wherein the peripheral diameter of the airbag is 610-675 mm or 630-655 mm when the gas generating amount of the gas generator is 0.75-0.85 mol.

19. The airbag apparatus according to claim 14, wherein the peripheral diameter of the airbag is 650-700 mm or 660-682 mm when the gas generating amount of the gas generator is from 0.85-0.95 mol.

20. The airbag apparatus according to claim 14, wherein the gas generating amount of the gas generator is configured to be 0.45-0.55 mol when the peripheral diameter of the airbag is 600 mm or lower, the gas generating amount of the gas generator is configured to be 0.6-0.7 mol when the peripheral diameter of the airbag is 600-615 mm, the gas generating amount of the gas generator is configured to be 0.75-0.85 mol when the peripheral diameter of the airbag is 615-655 mm, and the gas generating amount of the gas generator is configured to be 0.85-0.95 mol when the peripheral diameter of the airbag is 655 mm or higher.

21. The airbag apparatus according to claim 14, wherein a coefficient a expressed by (peripheral diameter of the airbag)/(gas generating amount of the gas generator) is larger than 722 and not larger than 1214, or larger than 733 and not larger than 1206.

22. The airbag apparatus according to claim 14, wherein the air bag is a passenger airbag, and the gas generating amount of the gas generator is less than 3 mol, or an output of the gas generator is less than 400 kPa.

* * * * *